United States Patent
Metzger et al.

(10) Patent No.: US 7,698,159 B2
(45) Date of Patent: Apr. 13, 2010

(54) SYSTEMS AND METHODS FOR PERFORMING DATA COLLECTION

(75) Inventors: Michael David Metzger, Lynchburg, VA (US); Diane M. Russell, Lynchburg, VA (US); Timothy Patrick Jon Perry, Lynchburg, VA (US)

(73) Assignee: Genworth Financial Inc., Richmond, WA (US)

( * ) Notice: Subject to any disclaimer, the term of this patent is extended or adjusted under 35 U.S.C. 154(b) by 1274 days.

(21) Appl. No.: 10/777,649

(22) Filed: Feb. 13, 2004

(65) Prior Publication Data

US 2005/0182667 A1    Aug. 18, 2005

(51) Int. Cl.
*G06Q 10/00* (2006.01)

(52) U.S. Cl. .................. 705/4; 705/2; 705/3; 715/221; 707/101; 707/104.1

(58) Field of Classification Search ................. 705/2–4; 707/104.1, 100; 715/221–226, 780
See application file for complete search history.

(56) References Cited

U.S. PATENT DOCUMENTS

| | | | |
|---|---|---|---|
| 4,642,768 A | 2/1987 | Roberts | |
| 4,722,055 A | 1/1988 | Roberts | |
| 4,766,539 A | 8/1988 | Fox | |
| 4,831,526 A | 5/1989 | Luchs et al. | |
| 4,837,693 A | 6/1989 | Schotz | |
| 4,839,804 A | 6/1989 | Roberts | |
| 4,975,840 A | 12/1990 | De Tore et al. | |
| 5,191,522 A | 3/1993 | Bosco et al. | |
| 5,202,827 A | 4/1993 | Sober | |
| 5,208,898 A | 5/1993 | Funabashi et al. | |

(Continued)

FOREIGN PATENT DOCUMENTS

EP    0621556 A2    10/1994

(Continued)

OTHER PUBLICATIONS http://web.archive.org/web/20021201125553/http://www.echoecho.com/jsforms02.htm (Printout included).*

(Continued)

*Primary Examiner*—Vivek D Koppikar
(74) *Attorney, Agent, or Firm*—Hunton & Williams

(57) ABSTRACT

Systems and methods are provided for performing data collection of insurance related submitted data provided by an applicant for insurance on a submitted form. The system may comprise a data input portion that inputs the submitted form so that the submitted data on the submitted form is available to a data entry operator; and a data collector tool, which processes entered data that is entered by the data entry operator, onto an internal electronic form, based on the submitted data submitted by the applicant. The data collector may include a form flow portion that presents the data entry operator with a series of form flows for collection of the submitted data, the form flows progressing through various user interface screens in collection of the submitted data, the form flows using content sensitive logic; and a metadata portion that generates metadata, the metadata containing information about the entered data, the metadata being progressively generated during progression of the form flows through the various user interface screens.

22 Claims, 23 Drawing Sheets

U.S. PATENT DOCUMENTS

| | | |
|---|---|---|
| 5,218,539 A | 6/1993 | Elphick et al. |
| 5,218,646 A | 6/1993 | Sirat et al. |
| 5,235,654 A | 8/1993 | Anderson et al. |
| 5,235,702 A | 8/1993 | Miller |
| 5,241,620 A | 8/1993 | Ruggiero |
| 5,359,509 A | 10/1994 | Little et al. |
| 5,523,942 A | 6/1996 | Tyler et al. |
| 5,537,315 A | 7/1996 | Mitcham |
| 5,586,313 A | 12/1996 | Schnittker et al. |
| 5,590,038 A | 12/1996 | Pitroda |
| 5,613,072 A | 3/1997 | Hammond |
| 5,619,621 A | 4/1997 | Puckett |
| 5,627,973 A | 5/1997 | Armstrong et al. |
| 5,636,117 A | 6/1997 | Rothstein |
| 5,649,085 A | 7/1997 | Lehr |
| 5,655,085 A | 8/1997 | Ryan et al. |
| 5,664,109 A | 9/1997 | Johnson |
| 5,696,907 A | 12/1997 | Tom |
| 5,701,400 A | 12/1997 | Amado |
| 5,712,984 A | 1/1998 | Hammond |
| 5,752,236 A | 5/1998 | Sexton |
| 5,752,237 A | 5/1998 | Cherny |
| 5,754,980 A | 5/1998 | Anderson |
| 5,758,341 A | 5/1998 | Voss |
| 5,768,422 A | 6/1998 | Yaeger |
| 5,774,761 A | 6/1998 | Rai |
| 5,796,863 A | 8/1998 | Lyon |
| 5,797,134 A | 8/1998 | McMillan |
| 5,805,730 A | 9/1998 | Yaeger et al. |
| 5,805,731 A | 9/1998 | Yaeger et al. |
| 5,809,478 A | 9/1998 | Greco |
| 5,819,230 A | 10/1998 | Christie |
| 5,835,897 A | 11/1998 | Dang |
| 5,839,103 A | 11/1998 | Mammone et al. |
| 5,839,113 A | 11/1998 | Federau |
| 5,845,256 A | 12/1998 | Pescitelli et al. |
| 5,850,480 A | 12/1998 | Scanlon |
| 5,852,808 A | 12/1998 | Cherny |
| 5,855,005 A | 12/1998 | Schuler |
| 5,870,721 A | 2/1999 | Norris |
| 5,870,733 A | 2/1999 | Bass |
| 5,873,066 A | 2/1999 | Underwood et al. |
| 5,884,274 A | 3/1999 | Walker |
| 5,893,072 A | 4/1999 | Zizzamia |
| 5,897,619 A | 4/1999 | Hargrove |
| 5,907,848 A | 5/1999 | Zaiken et al. |
| 5,930,392 A | 7/1999 | Ho |
| 5,930,759 A | 7/1999 | Moore et al. |
| 5,956,691 A | 9/1999 | Powers |
| 5,970,464 A | 10/1999 | Apte et al. |
| 5,978,769 A | 11/1999 | Brown |
| 5,987,434 A | 11/1999 | Libman |
| 6,003,007 A | 12/1999 | DiRienzo |
| 6,009,402 A | 12/1999 | Whitworth |
| 6,014,676 A | 1/2000 | McClain |
| 6,018,714 A | 1/2000 | Risen |
| 6,023,691 A | 2/2000 | Bertrand et al. |
| 6,026,363 A | 2/2000 | Shepard |
| 6,044,352 A | 3/2000 | Deavers |
| 6,049,773 A | 4/2000 | McCormack et al. |
| 6,064,970 A | 5/2000 | McMillan |
| 6,070,148 A | 5/2000 | Mori et al. |
| 6,076,066 A | 6/2000 | DiRienzo et al. |
| 6,078,890 A | 6/2000 | Mangin |
| 6,088,677 A | 7/2000 | Spurgeon |
| 6,088,686 A | 7/2000 | Walker et al. |
| 6,098,070 A | 8/2000 | Maxwell |
| 6,112,190 A | 8/2000 | Fletcher et al. |
| 6,115,694 A | 9/2000 | Cheetham et al. |
| 6,119,093 A | 9/2000 | Walker |
| 6,125,194 A | 9/2000 | Yeh et al. |
| 6,128,598 A | 10/2000 | Walker |
| 6,141,648 A | 10/2000 | Bonissone et al. |
| 6,144,941 A | 11/2000 | Hotti |
| 6,151,584 A * | 11/2000 | Papierniak et al. ............ 705/10 |
| 6,163,770 A | 12/2000 | Gamble |
| 6,178,406 B1 | 1/2001 | Cheetham et al. |
| 6,182,048 B1 | 1/2001 | Osborn |
| 6,185,555 B1 | 2/2001 | Sprenger |
| 6,186,793 B1 | 2/2001 | Brubaker |
| 6,208,974 B1 | 3/2001 | Campbell et al. |
| 6,223,094 B1 | 4/2001 | Muehleck |
| 6,246,991 B1 | 6/2001 | Abe |
| 6,266,645 B1 | 7/2001 | Simpson |
| 6,272,482 B1 | 8/2001 | McKee et al. |
| 6,304,859 B1 | 10/2001 | Ryan |
| 6,314,415 B1 | 11/2001 | Mukherjee |
| 6,415,284 B1 * | 7/2002 | D'Souza et al. ................. 707/3 |
| 6,519,578 B1 | 2/2003 | Reddy |
| 6,529,876 B1 | 3/2003 | Dart |
| 6,538,831 B1 | 3/2003 | Ikeda |
| 6,542,905 B1 | 4/2003 | Fogel et al. |
| 6,549,888 B1 | 4/2003 | Aieta |
| 6,553,365 B1 | 4/2003 | Summerlin et al. |
| 6,584,446 B1 | 6/2003 | Buchanan |
| 6,594,668 B1 | 7/2003 | Hudy |
| 6,604,080 B1 | 8/2003 | Kern |
| 6,647,374 B2 | 11/2003 | Kansal |
| 6,683,697 B1 | 1/2004 | Lech et al. |
| 6,684,188 B1 | 1/2004 | Mitchell et al. |
| 6,684,189 B1 | 1/2004 | Ryan et al. |
| 6,714,925 B1 | 3/2004 | Barnhill et al. |
| 6,725,220 B2 | 4/2004 | Stratlgos |
| 6,731,993 B1 * | 5/2004 | Carter et al. ................... 700/94 |
| 6,757,668 B1 | 6/2004 | Goebel et al. |
| 6,823,319 B1 | 11/2004 | Lynch et al. |
| 6,826,539 B2 | 11/2004 | Loveland |
| 6,829,584 B2 | 12/2004 | Loveland |
| 6,862,571 B2 | 3/2005 | Martin |
| 6,868,386 B1 | 3/2005 | Henderson |
| 6,869,362 B2 | 3/2005 | Walker |
| 6,871,181 B2 | 3/2005 | Kansal |
| 6,877,132 B1 * | 4/2005 | De et al. ...................... 714/795 |
| 6,886,061 B2 | 4/2005 | Yokota |
| 6,922,720 B2 | 7/2005 | Cianciarulo |
| 6,937,990 B1 | 8/2005 | Walker |
| 6,944,597 B2 | 9/2005 | Callen |
| 6,963,853 B1 | 11/2005 | Smith |
| 6,970,827 B2 | 11/2005 | Zeltzer |
| 6,999,935 B2 | 2/2006 | Parankirinathan |
| 7,013,298 B1 | 3/2006 | De La Huerga |
| 7,020,692 B2 | 3/2006 | Cianciarulo |
| 7,024,384 B2 | 4/2006 | Daughtery, III |
| 7,027,992 B2 | 4/2006 | Zaccaria |
| 7,050,932 B2 | 5/2006 | Selby et al. |
| 7,062,706 B2 * | 6/2006 | Maxwell et al. ............. 715/224 |
| 7,117,450 B1 * | 10/2006 | Chaudhri .................... 715/787 |
| 7,127,407 B1 | 10/2006 | Averill |
| 7,130,779 B2 | 10/2006 | Beverina |
| 7,143,051 B1 | 11/2006 | Hanby |
| 7,260,549 B2 | 8/2007 | Spielmann et al. |
| 7,320,003 B2 | 1/2008 | Perry |
| 7,325,076 B1 * | 1/2008 | Morrison et al. ............ 709/246 |
| 2001/0032099 A1 | 10/2001 | Joao |
| 2001/0049611 A1 | 12/2001 | Peach |
| 2001/0053986 A1 | 12/2001 | Dick |
| 2001/0056433 A1 | 12/2001 | Adelson |
| 2002/0010679 A1 | 1/2002 | Felsher |
| 2002/0026335 A1 | 2/2002 | Honda |
| 2002/0032585 A1 | 3/2002 | Keyes |
| 2002/0035490 A1 | 3/2002 | Ohmoto |
| 2002/0040306 A1 | 4/2002 | Sugiyama |
| 2002/0049618 A1 | 4/2002 | McClure |
| 2002/0055862 A1 | 5/2002 | Jinks |

| | | | | | | |
|---|---|---|---|---|---|---|
| 2002/0059126 A1 | 5/2002 | Ricciardi | | 2004/0039608 A1 | 2/2004 | Mazur |
| 2002/0072936 A1 | 6/2002 | Newman | | 2004/0039610 A1 | 2/2004 | Weitermann |
| 2002/0077860 A1 | 6/2002 | Earnest et al. | | 2004/0044763 A1* | 3/2004 | Besson ................... 709/224 |
| 2002/0087364 A1 | 7/2002 | Lerner et al. | | 2004/0049506 A1 | 3/2004 | Ghouri |
| 2002/0091550 A1 | 7/2002 | White et al. | | 2004/0054621 A1 | 3/2004 | Bretvin |
| 2002/0095317 A1 | 7/2002 | McCabe | | 2004/0059608 A1 | 3/2004 | Gore |
| 2002/0099596 A1 | 7/2002 | Geraghty | | 2004/0059639 A1 | 3/2004 | Ripper |
| 2002/0111834 A1 | 8/2002 | Kogure | | 2004/0078243 A1 | 4/2004 | Fisher |
| 2002/0111835 A1 | 8/2002 | Hele et al. | | 2004/0078250 A1 | 4/2004 | Schorb |
| 2002/0116231 A1 | 8/2002 | Hele et al. | | 2004/0093241 A1 | 5/2004 | Stone |
| 2002/0120474 A1 | 8/2002 | Hele et al. | | 2004/0093242 A1 | 5/2004 | Cadigan et al. |
| 2002/0120560 A1 | 8/2002 | Morgan | | 2004/0103003 A1 | 5/2004 | Mayers |
| 2002/0123910 A1 | 9/2002 | Hereford | | 2004/0103012 A1 | 5/2004 | Nussbaum |
| 2002/0128880 A1 | 9/2002 | Kunikiyo | | 2004/0128147 A1 | 7/2004 | Vallinayagam |
| 2002/0128882 A1 | 9/2002 | Nakagawa | | 2004/0128170 A1 | 7/2004 | MacKethan et al. |
| 2002/0138307 A1 | 9/2002 | Kramer | | 2004/0128172 A1 | 7/2004 | Van Cleave |
| 2002/0143585 A1 | 10/2002 | Kodama | | 2004/0138927 A1 | 7/2004 | Eydeland |
| 2002/0143586 A1 | 10/2002 | Kodama | | 2004/0153346 A1 | 8/2004 | Grundel |
| 2002/0156655 A1 | 10/2002 | Matsuda | | 2004/0172308 A1 | 9/2004 | Macchia |
| 2002/0161609 A1 | 10/2002 | Zizzamia | | 2004/0172311 A1 | 9/2004 | Kauderer |
| 2002/0169641 A1 | 11/2002 | Wallace | | 2004/0181435 A9 | 9/2004 | Snell |
| 2002/0173995 A1 | 11/2002 | Schiminovich | | 2004/0186749 A1 | 9/2004 | Iwuagwu |
| 2002/0178033 A1 | 11/2002 | Yoshioka | | 2004/0186753 A1 | 9/2004 | Kim |
| 2002/0188467 A1 | 12/2002 | Eke | | 2004/0193455 A1 | 9/2004 | Kellington |
| 2002/0194033 A1 | 12/2002 | Huff | | 2004/0199410 A1 | 10/2004 | Feyen |
| 2003/0023462 A1 | 1/2003 | Heilizer | | 2004/0204858 A1 | 10/2004 | Brumbaugh |
| 2003/0028404 A1 | 2/2003 | Herron et al. | | 2004/0220837 A1 | 11/2004 | Bonissone |
| 2003/0036927 A1 | 2/2003 | Bowen | | 2004/0220838 A1 | 11/2004 | Bonissone |
| 2003/0061075 A1 | 3/2003 | Heckman | | 2004/0220839 A1 | 11/2004 | Bonissone |
| 2003/0065539 A1 | 4/2003 | Kay | | 2004/0220840 A1 | 11/2004 | Bonissone |
| 2003/0069760 A1 | 4/2003 | Gelber | | 2004/0230459 A1 | 11/2004 | Dordick |
| 2003/0074231 A1 | 4/2003 | Renes | | 2004/0230460 A1 | 11/2004 | Thomas |
| 2003/0074235 A1 | 4/2003 | Gregory | | 2004/0236611 A1 | 11/2004 | Bonissone |
| 2003/0078817 A1 | 4/2003 | Harrison | | 2004/0243449 A1 | 12/2004 | Neustadt |
| 2003/0088443 A1 | 5/2003 | Majikes | | 2004/0249678 A1 | 12/2004 | Henderson |
| 2003/0088488 A1 | 5/2003 | Solomon | | 2004/0249679 A1 | 12/2004 | Henderson |
| 2003/0093302 A1 | 5/2003 | Quido | | 2004/0260594 A1* | 12/2004 | Maddox, Jr. ................... 705/9 |
| 2003/0093304 A1 | 5/2003 | Keller | | 2004/0267577 A1 | 12/2004 | Nakai |
| 2003/0097281 A1 | 5/2003 | Momose | | 2004/0267578 A1 | 12/2004 | Pearson |
| 2003/0101080 A1 | 5/2003 | Zizzamia | | 2004/0267579 A1 | 12/2004 | Markman |
| 2003/0101081 A1 | 5/2003 | Putnam | | 2005/0022122 A1* | 1/2005 | Barrus et al. ................ 715/530 |
| 2003/0120557 A1 | 6/2003 | Evans et al. | | 2005/0027571 A1 | 2/2005 | Gamarnik |
| 2003/0142043 A1 | 7/2003 | Matsueda | | 2005/0027572 A1 | 2/2005 | Goshert |
| 2003/0144874 A1 | 7/2003 | Barret et al. | | 2005/0043971 A1 | 2/2005 | Hendrickson |
| 2003/0144888 A1 | 7/2003 | Baron | | 2005/0055248 A1 | 3/2005 | Helitzer |
| 2003/0158758 A1 | 8/2003 | Kanazawa | | 2005/0055249 A1 | 3/2005 | Helitzer |
| 2003/0167191 A1 | 9/2003 | Slabonik | | 2005/0060203 A1 | 3/2005 | LaJoie |
| 2003/0172043 A1 | 9/2003 | Guyon et al. | | 2005/0060207 A1 | 3/2005 | Weidner |
| 2003/0176931 A1 | 9/2003 | Pednault et al. | | 2005/0060208 A1 | 3/2005 | Gianantoni |
| 2003/0177032 A1 | 9/2003 | Bonissone | | 2005/0071181 A1 | 3/2005 | Christ |
| 2003/0182159 A1 | 9/2003 | Bonissone | | 2005/0071204 A1 | 3/2005 | Parankirinathan |
| 2003/0187693 A1 | 10/2003 | Oka | | 2005/0075911 A1 | 4/2005 | Craven |
| 2003/0187696 A1 | 10/2003 | Bonissone | | 2005/0080649 A1 | 4/2005 | Alvarez |
| 2003/0187697 A1 | 10/2003 | Bonissone | | 2005/0086084 A1 | 4/2005 | Dillard |
| 2003/0187698 A1 | 10/2003 | Bonissone | | 2005/0102168 A1 | 5/2005 | Thomas |
| 2003/0187699 A1 | 10/2003 | Bonissone | | 2005/0102170 A1 | 5/2005 | Lefever |
| 2003/0187700 A1 | 10/2003 | Bonissone | | 2005/0102171 A1 | 5/2005 | Ashley |
| 2003/0187701 A1 | 10/2003 | Bonissone | | 2005/0102172 A1 | 5/2005 | Sirmans |
| 2003/0187702 A1 | 10/2003 | Bonissone | | 2005/0108062 A1 | 5/2005 | Higgins |
| 2003/0187703 A1 | 10/2003 | Bonissone | | 2005/0108064 A1 | 5/2005 | Castleman |
| 2003/0187704 A1 | 10/2003 | Hashiguchi | | 2005/0108066 A1 | 5/2005 | Weidner |
| 2003/0195776 A1 | 10/2003 | Moore | | 2005/0114184 A1 | 5/2005 | Rock |
| 2003/0208385 A1 | 11/2003 | Zander | | 2005/0119919 A1 | 6/2005 | Eder |
| 2003/0233260 A1 | 12/2003 | Snell | | 2005/0119920 A1 | 6/2005 | Murphy |
| 2003/0233323 A1 | 12/2003 | Bilski | | 2005/0125253 A1 | 6/2005 | Bonissone |
| 2003/0236685 A1 | 12/2003 | Buckner | | 2005/0125259 A1 | 6/2005 | Annappindi |
| 2003/0236686 A1 | 12/2003 | Matsumoto | | 2005/0131742 A1 | 6/2005 | Hoffman |
| 2004/0004453 A1* | 1/2004 | Junnan et al. ................ 318/254 | | 2005/0137911 A1 | 6/2005 | Conn |
| 2004/0019575 A1 | 1/2004 | Talbot et al. | | 2005/0137914 A1 | 6/2005 | Schmitter |
| 2004/0024618 A1 | 2/2004 | Martin | | 2005/0137915 A1 | 6/2005 | Martin |
| 2004/0024619 A1 | 2/2004 | DiBella | | 2005/0144045 A1 | 6/2005 | Corsi |
| 2004/0024620 A1 | 2/2004 | Robertson | | 2005/0144046 A1 | 6/2005 | Schloss |
| 2004/0030589 A1 | 2/2004 | Leisher | | 2005/0144047 A1 | 6/2005 | Tran |

| | | | |
|---|---|---|---|
| 2005/0154618 A1 | 7/2005 | Kita | |
| 2005/0154619 A1 | 7/2005 | Barr | |
| 2005/0177401 A1 | 8/2005 | Koeppel | |
| 2005/0182666 A1 | 8/2005 | Perry | |
| 2005/0182667 A1 | 8/2005 | Metzger | |
| 2005/0182669 A1 | 8/2005 | Tinnirello | |
| 2005/0182670 A1 | 8/2005 | Burgess | |
| 2005/0187798 A1 | 8/2005 | Conn | |
| 2005/0187799 A1 | 8/2005 | McGiffin | |
| 2005/0192849 A1 | 9/2005 | Spalding | |
| 2005/0203778 A1 | 9/2005 | Chen | |
| 2005/0209894 A1 | 9/2005 | Wilson | |
| 2005/0216426 A1 | 9/2005 | Weston et al. | |
| 2005/0228699 A1 | 10/2005 | Samuels | |
| 2005/0240447 A1 | 10/2005 | Kil | |
| 2005/0246207 A1 | 11/2005 | Noonan | |
| 2005/0256747 A1 | 11/2005 | Hellrigel | |
| 2005/0261943 A1 | 11/2005 | Quarterman | |
| 2005/0267783 A1 | 12/2005 | Zaccaria | |
| 2005/0267785 A1 | 12/2005 | Parankirinathan | |
| 2005/0273370 A1 | 12/2005 | Udell | |
| 2005/0273371 A1 | 12/2005 | Callen | |
| 2005/0278199 A1 | 12/2005 | Ghani | |
| 2005/0288968 A1 | 12/2005 | Collins | |
| 2005/0288971 A1 | 12/2005 | Cassandra | |
| 2006/0015373 A1 | 1/2006 | Cuypers | |
| 2006/0015374 A1 | 1/2006 | Ochs | |
| 2006/0026044 A1 | 2/2006 | Smith | |
| 2006/0026045 A1 | 2/2006 | Rothschild | |
| 2006/0031104 A1 | 2/2006 | Gianantoni | |
| 2006/0041454 A1 | 2/2006 | Matisonn | |
| 2006/0047540 A1 | 3/2006 | Hutten | |
| 2006/0059020 A1 | 3/2006 | Davidson | |
| 2006/0064331 A1 | 3/2006 | Odermott | |
| 2006/0064332 A1 | 3/2006 | Schoenbaum | |
| 2006/0074724 A1 | 4/2006 | Schwartz | |
| 2006/0080139 A1 | 4/2006 | Mainzer | |
| 2006/0080153 A1 | 4/2006 | Fox | |
| 2006/0085230 A1 | 4/2006 | Brill | |
| 2006/0089860 A1 | 4/2006 | Fitzmorris | |
| 2006/0089861 A1 | 4/2006 | King | |
| 2006/0095301 A1 | 5/2006 | Gay | |
| 2006/0095304 A1 | 5/2006 | Madison | |
| 2006/0095305 A1 | 5/2006 | Madison | |
| 2006/0100912 A1 | 5/2006 | Kumar | |
| 2006/0108434 A1 | 5/2006 | Kallestad | |
| 2006/0122871 A1 | 6/2006 | Cowley | |
| 2006/0129427 A1 | 6/2006 | Wennberg | |
| 2006/0129428 A1 | 6/2006 | Wennberg | |
| 2006/0167735 A1* | 7/2006 | Ward | 705/8 |
| 2006/0241982 A1 | 10/2006 | Seifert et al. | |
| 2006/0253305 A1 | 11/2006 | Dougherty | |
| 2006/0287892 A1 | 12/2006 | Jones | |
| 2007/0011033 A1 | 1/2007 | Atkinson | |
| 2007/0118554 A1* | 5/2007 | Chang et al. | 707/102 |

FOREIGN PATENT DOCUMENTS

| | | |
|---|---|---|
| WO | WO 98/22936 | 5/1998 |
| WO | WO 01/20512 A2 | 3/2001 |
| WO | 01/93193 | 6/2001 |
| WO | 01/63445 | 8/2001 |
| WO | WO 01/88834 A2 | 11/2001 |
| WO | 2004/008256 | 11/2004 |

OTHER PUBLICATIONS

Gonzalez et al., "*A case-based reasoning approach to real estate property appraisal*," Systems with Applications, vol. 4, pp. 229-246, 1992.

Bonissone et al., "*Evolutionary optimization of fuzzy decision systems for automated insurance underwriting*," Proceedings of the 2002 IEEE International Conference on Fuzzy Systems, May 12-17, 2002, pp. 1003-1008.

Bonissone et al, "*Fuzzy case-based reasoning for decision making*," 2001 IEEE International Fuzzy Systems Conference, pp. 995-998.

Keeney et al., *Decisions with Multiple Objective: Preferences and Value Tradeoffs* book, 1976, John Wiley & Sons, Inc., preface pages, acknowledgement page, Chapter Headings p. xv, Contents pp. xvii-xxviii.

Duda et al., "*Pattern Classification*" book, $2^{nd}$ Edition, John Wiley & Songs, Inc., 2001, Contents pp. vii-xvi, Preface pp. xvii-xx.

Shafer, "*A Mathematical Theory of Evidence*" book, published by Princeton University Press, Princeton and London, 1976, Preface pp. ix-x, Contents pp. xi-xiii.

Kuncheva et al., "*Designing Classifier Fusion System by Genetic Algorithms*," IEEE Transactions of Evolutionary Computation, vol. 4, No. 4, Sep. 2000, pp. 327-336.

Chibelushi et al., "*Adaptive Classifier Integration for Robust Pattern Recognition*," IEEE Transactions on Systems, Man, and Cybernetics—Part B: Cybernetics, vol. 29, No. 6, Dec. 1999, pp. 902-907.

Dempster, "*Upper and Lower Probabilities Induced By A Multivalued Mapping*," Annals of Mathematical Statistics, Harvard University, 38:, pp. 325-339, 1967.

Bonissone et al., "*Selecting Uncertainty Calculi and Granularity and Experiment in Trading-Off Precision and Complexity*," Uncertainty in Artificial Intelligence, Kanal & Lemmer (editors), pp. 217-247, Elsevier Science Publishers B.V. (North-Holland), 1986.

Bonissone, "*Summarizing and Propagating Uncertain Information With Triangular Norms*," International Journal of Approximate Reasoning, Elsevier Science Publishing Co., Inc., New York, NY, 1: pp. 71-101, 1987.

Xu, et al., "*Methods of Combining Multiple Classifiers and Their Applications to Handwriting Recognition*," IEEE Transactions on Systems, Man, and Cybernetics, vol. 22, No. 3, pp. 418-435, May/Jun. 1992.

Fairhurst et al., "*Enhancing Consensus in Multiple Expert Decision Fusion*," IEE Proceedings Vis. Image Signal Process, vol. 147, No. 1, 2000.

Ruspini, "*Epistemic Logics, Probability, and the Calculus of Evidence*," Proc. Tenth Intern Joint Conf. on Artificial Intelligence, Milan, Italy, Reasoning pp. 924-931, 1987.

Schweizer et al., "*Associative Functions and Abstract Semigroups*," Publicationes Mathematicae Debrecen, 10:pp. 69-81, 1963.

Srivastava et al., "*A Hybrid Neural Network Model for Fast Voltage Contingency Screening and Ranking*," International Journal of Electrical Power & Energy Systems, vol. 22, No. 1, pp. 35-42.

Lampinen et al., "*Selection of Training Samples for Learning With Hints*," 1JCNN 1999 IEEE, International Joint Conference on Neural Networks, vol. 2, pp. 1438-1441.

Abu-Mostafa, "*Hints and the VC Dimension*," Neural Computation, vol. 5, No. 2, Mar. 1993, pp. 278-288.

Ding et al., "*Multi-class Protein Fold Recognition Using Support Vector Machines and Neural Networks*," Bioinformatics, vol. 17, No. 4, 2001, pp. 349-358.

Dorizzi et al., "*Cooperation and Modularity for Classification Through Neural Network Techniques*," Proceedings of 1993 International Conference on System, Man and cybernetics, vol. 3, pp. 469-474.

Price et al., "*Pairwise Neural Network Classifiers with Probabilistic Outputs*," Tesauro et al., eds., Neural Information Processing Systems, vol. 7, 1994, pp. 1109-1116.

Vaughn et al., "*Interpretation and Knowledge Discovery from a Multilayer Perception Network that Performs Whole Life Assurance Risk Assessment*," Neural Computing & Applications, Springer-Verlag London.

Collins et al., "*An Application of a Multiple Neural Network Learning System to Emulation of Mortgage Underwriting Judgements*," Proceedings of the IEEE International Conference on Neural Networks, 1988, pp. II-459 through II-466.

Nossek et al., "*Classification Systems Based on Neural Networks*," the Fifth IEEE International Workshop on Cellular Neural Networks and their Applications, London, England, Apr. 14-17, 1998, pp. 26-33.

Abu-Mostafa, "*A Method for Learning from Hints*," in Hanson, Cowan & Giles eds., Advances in Neural Information Processing Systems, vol. 5, pp. 73-80, Morgan Kaufmann, San Mateo, CA.

Beradi et al., "*The Effect of Misclassification Costs on Neural Network Classifiers*," Decision Sciences, vol. 30, No. 3, summer 1999, pp. 659-682.

Tong et al., "*Linguistic Approach to Decisionmaking with Fuzzy Sets*," IEEE Transactions on Systems, Man, and Cybernetics, vol. SMC-10, No. 11, Nov. 1990, pp. 716-723.

MacCrimmon, "*An Overview of Multiple Objective Decision Making*," editors Cochrane and Zeleny, 1973, pp. 18-44.

Kung et al., "*On Finding the Maxima of a Set of Vectors*," Journal of the Association for Computing Machinery, vol. 22, No. 4, Oct. 1975, pp. 469-476.

Bentley et al., "*On the Average Number of Maxima in a Set of Vectors and Applications*," Journal of the Association for Computing Machinery, vol. 25, No. 4, Oct. 1978, pp. 536-543.

Simon, "*A Behavioral Model of Rational Choice*," Quarterly Journal of Economics, vol. 69, No. 1, Feb. 1955, pp. 99-118.

Zionts, "*Decision Making: Some Experiences, Myths and Observations*," Multiple criteria Decision Making: Proceedings of the Twelfth International Conference, Lecture notes in Economics and Mathematical Systems, vol. 448, Hagen (Germany), 1997, pp. 233-241.

Friedman, "*Multivariate Adaptive Regression Splines*," Annals of Statistics, SLAC PUB-4960 Rev, Tech Report 102 Rev, Aug. 1990, pp. 1-79.

Schumaker, Discussion of Friedman paper, "*Multivariate Adaptive Regression Splines*," pp. 1-2.

Owen, Discussion of Friedman paper, "*Multivariate Adaptive Regression Splines*," pp. 1-9 & Figs. 1-4.

Stone, Discussion of Friedman paper, "*Multivariate Adaptive Regression Splines*," pp. 1-3.

O'Sullivan, Some Comments on Friedman paper, "*Multivariate Adaptive Regression Splines*," pp. 1-6.

Breiman, Discussion of Friedman paper, "*Multivariate Adaptive Regression Splines*," 8 pages.

Golubev et al., Discussion of Friedman paper, "*Multivariate Adaptive Regression Splines*," 2 pages.

Buja et al., Discussion of Friedman paper, "*Multivariate Adaptive Regression Splines*," pp. 1-5.

Gu et al., Comments on Friedman paper, "*Multivariate Adaptive Regression Splines*," pp. 1-10, rev. Jun. 5, 1990.

Barron et al., Discussion of Friedman paper, "*Multivariate Adaptive Regression Splines*," pp. 1-12 and 2 pages of Tables, Jul. 1990, University of IL.

Friedman, "*Rejoinder*," pp. 1-14.

Goetz, "A Fuzzy Future for MIS?", Informationweek, p. 51, Feb. 25, 1991, ISSN: 8750-6874. Dialog ID No. 01544473, From Dialog file 16 (Gale Group).

Allwein et al., "Reducing Multiclass to Binary: A Unifying Approach for Margin Classifiers", Journal of Machine Learning Research, vol. 1, (2000), pp. 113-141.

Rubtsov et al., "A Unified Format for Trained Neural Network Description", Neural Network, Proceedings IJCNN '01 International Joint Conference, vol. 4, pp. 2367-2372, Meeting date: Jul. 15-19, 2001.

Yang, "An Evaluation of Statistical Approaches to Text Categorization", Kluwer Academic Publishers, Information Retrieval 1, pp. 69-90.

Foltin et al., "*Beyond expert systems: Neural networks in accounting*," National Public Accountant, Jun. 1996, pp. 26-30, v41n6.

Humpert, Bidirectional Associative Memory with Several Patterns, 1990, ISU, CS-122, I-741-I-750.

Waxman et al., "Information Fusion for Image Analysis: Geospatial Foundations for Higher Fusion", 2002, ISIF, 562-569.

Yap, Jr. et al., "Generalized Associative Memory Models for Data Fusion", 2003, IEEE, 0-7803-7898-9/03, 2528-2533.

Goetz, "Clearing up fuzzy logic—Forum—Column", Software Magazine, Jan. 1992, Wiesner Publications, Inc.

Haberman, et al., Generalised Linear Models in Actuarial Work, Presented to the Staple Inn Actuarial Society, Feb. 2, 1998.

Borglin, et al., Stochastic Dominance and Conditional Expectation—An Theoretical Approach, The Geneva Papers on risk and Insurance Theory, 27:31-48, 2002.

Watje, et al., U.S. Appl. No. 09/510,535.

Apte, et al., RAMP: Rules Abstraction for Modeling and Prediction, IBM Research Division Technical Report RC-20271, IBM T.J. Watson Research Center, Jan. 12, 1996, pp. 1-14.

Finger, Robert J., Chapter 6 Risk Classification, Foundations of Casualty Actuarial Science, 4th Edition 2001, pp. 287-341.

Murphy, et al., Using Generalized Liner Models To Build Dynamic Pricing Systems, Casualty Actuarial Science, Winter 2000, pp. 106-139.

Brockett, et al., Operations Research in Insurance: A Review, Transactions of Society of Actuaries, 1995, vol. 47, pp. 7-87.

Aggour, et al., Automating the Underwriting of Insurance Applications, AI Magazine, Fall 2006, pp. 36-50.

\* cited by examiner

Form Buttons

| Button Name | Placement | Action |
|---|---|---|
| Previous | Include on all but the first page. | Saves the form and takes the DEO to the previous page of the form. |
| Next | Include on all but the last page. | Saves the form and takes the DEO to the next page of the form. |
| Cancel | Include on all pages. | Returns the DEO to the "Application Package" page without saving. Status will not be changed, unless other pages of the form have been saved. Opens a confirmation window prior to closing form. |
| Save | Include on all but the last page. | Save page data. |
| Save and Close | Include on all pages. | Saves page data and returns DEO to the "Application Package" page. Updates the status to "saved." |
| Submit | Include only on last page. | Saves and submits the form. Sets the form status as complete in the "Application Package" page. |

Figure 6

Content sensitive logic

| Event | Action |
|---|---|
| User selects "Other" from a combo box | System displays an "Other" text box. |
| User selects "Other" checkbox in a group of checkboxes | System displays the "Other" group box. |
| User clicks an "Address" button | System displays the address fields. |
| User selects multiple values from a list box. | System displays flows for each value selected. |
| User selects "other" radio button | System displays the "Other" group box. |

Figure 8

Sample Remarks Question

Do you have any other application or informal inquiry for life insurance pending in any company or society?

R40 ☐ Yes ☐ No    Remarks R40

902

Sample remarks question

Figure 9

Signature Verification

Proposed Insured Signature: Detailed signature verification

- ● Signature matches name
- ○ Signature does not match name
- ○ Can not tell if signature matches name
- ○ Signed with an X
- ○ Form is not signed Did the agent sign the form? ○ Yes ○ No  Normal signature verification

Attribute Activation and Identification

| Attribute | Activation | Identification |
|---|---|---|
| Altered | CTRL+G or via page level validation window. | Green Label |
| Blank* | CTRL+B or via page level validation window. | Bold Label |
| Unreadable* | CTRL+U or via combination level validation. | Underline Label |
| Failed mask** | System Driven | Italic Label |
| Altered and blank | Both attributes activated separately as previously mentioned. | Green and Bold |
| Altered and unreadable | Both attributes activated separately as previously mentioned. | Green and Underlined |
| Altered and failed mask | Both attributes activated separately as previously mentioned. | Green and Italic |

*Usage: System will not allow user to tag a field as blank or unreadable if there is data in the field. Likewise, the system will remove existing blank and unreadable tags from a field if a user enters data into the field. Allow users to switch between Blank and Unreadable without warning.

**Usage: System will check mask fields upon exit and automatically set this attribute to FM or not FM. User can not modify this attribute.

| Condition | Message |
|---|---|
| Field set as "BLANK" and:<br>• Text field is not empty.<br>• List box has other than "blank" selected.<br>• Checkbox group has any checkbox checked. | Validation Error "BLANK"<br>This field cannot be marked "BLANK" if data is present.<br>Choose "OK" to clear the field, set field as BLANK, and proceed to next field. Choose "CANCEL" to return to the field to correct the data.<br>[OK] [Cancel] |
| Field set as "UNREADABLE" and:<br>• Text field is not empty.<br>• List box has other than "blank" selected.<br>• Checkbox group has any checkbox checked. | Validation Error "UNREADABLE"<br>This field cannot be marked "UNREADABLE" if data is present.<br>Choose "OK" to clear the field, set field as UNREADABLE, and proceed to next field. Choose "CANCEL" to return to the field to correct the data.<br>[OK] [Cancel] |

| Mask Name | Mask |
|---|---|
| Phone Number Mask | (NNN) NNN-NNNN ext NNNNN |
| Date Mask | MM/DD/CCYY |
| Zip Code Mask | US: NNNNN-NNNN<br>CANADA: #AN ANAN<br>OTHER: No mask |
| SSN Mask | NNN-NN-NNNN |
| TIN Mask | NN-NNNNNNN |
| Dollar Amount Mask | $NNN,NNN,NNN.NN |
| Percentage Mask | NNN.NN% |
| Driver's License Mask | NNNN-NN-NNNN |
| Years | NNN |
| Age | NNN |

| Condition | Message |
|---|---|
| Field fails checkbox combination. | Failed Combination<br>You have selected an invalid combination of checkboxes. This question allows for only one checkbox selection.<br><br>Choose "OK" to clear the field, set field as UNREADABLE, and proceed to next field. Choose "CANCEL" to return to the field to correct the data.<br><br>[OK] [Cancel] |

SYSTEMS AND METHODS FOR PERFORMING DATA COLLECTION

BACKGROUND OF THE INVENTION

Various processes and systems are known to effect data entry within the insurance industry. Typically such data entry might include a person reviewing a hand written form and transferring the information on the handwritten form into electronic form, i.e., by entering the information into a database using a computer, for example. The various systems that are known contain various pieces of functionality.

However, none of the known systems provide all or the type of functionality that is required in today's competitive market. A data entry person working for an insurance related entity is faced with complex forms from which to retrieve information. The data entry process is often complicated by the manner in which the form was completed by the applicant, especially if the paper form was not specifically designed with data entry in mind. For example, the applicant may not provide complete information, may enter remarks on a margin of a form, may fill in two selections where the question requires a "one or the other" answer or may materially alter entries. Further, when faced with hundreds of forms to complete, every efficiency that can be provided to the data entry person is highly desired.

Accordingly, the systems and methods of the embodiments of the invention provide a novel arrangement of features that address the above needs, as well as others.

BRIEF SUMMARY OF THE INVENTION

Systems and methods are provided for performing data collection of insurance related submitted data, provided by an applicant for insurance, on a submitted form. In accordance with one embodiment of the invention, the system may comprise a data input portion that inputs the submitted form so that the submitted data on the submitted form is available to a data entry operator; and a data collector tool, which processes entered data that is entered by the data entry operator, onto an internal electronic form, based on the submitted data submitted by the applicant. The data collector may include a form flow portion that presents the data entry operator with a series of form flows for collection of the submitted data, the form flows progressing through various user interface screens in collection of the submitted data, the form flows using content sensitive logic; and a metadata portion that generates metadata, the metadata containing information about the entered data, the metadata being progressively generated during progression of the form flows through the various user interface screens.

BRIEF DESCRIPTION OF THE DRAWINGS

The present invention can be more fully understood by reading the following detailed description together with the accompanying drawings, in which like reference indicators are used to designate like elements, and in which:

FIG. 6 is a table showing navigation buttons that may be provided on a data entry page in accordance with one embodiment of the invention;

FIG. 8 is a table showing examples of content sensitive logic in accordance with one embodiment of the invention;

FIG. 9 is a user interface showing an example of a question with a "remarks"flow in accordance with one embodiment of the invention;

FIG. 13 is a user interface showing examples of both a detailed and a normal signature verification in accordance with one embodiment of the invention;

FIG. 14 shows various attributes, i.e., metadata, that may be used in operation of the data collector tool in accordance with one embodiment of the invention;

FIG. 15 is a table that describes conditions in which a validation query is presented to the data entry operator or other user in accordance with one embodiment of the invention;

FIG. 17 is a table that lists illustrative masks, which may be used in operation of the data collector tool in accordance with one embodiment of the invention;

FIG. 18 is a table that describes a particular condition that a field has "failed the checkbox combination" and the resulting "failed combination" validation window in accordance with one embodiment of the invention;

FIG. 19 is a user interface showing a page level validation screen in accordance with one embodiment of the invention;

FIG. 20 is a sample form flow showing a blend of possible information found on a form flow, as well as descriptive text highlighting the features of the form in accordance with one embodiment of the invention;

DETAILED DESCRIPTION OF THE INVENTION

Figure 1:
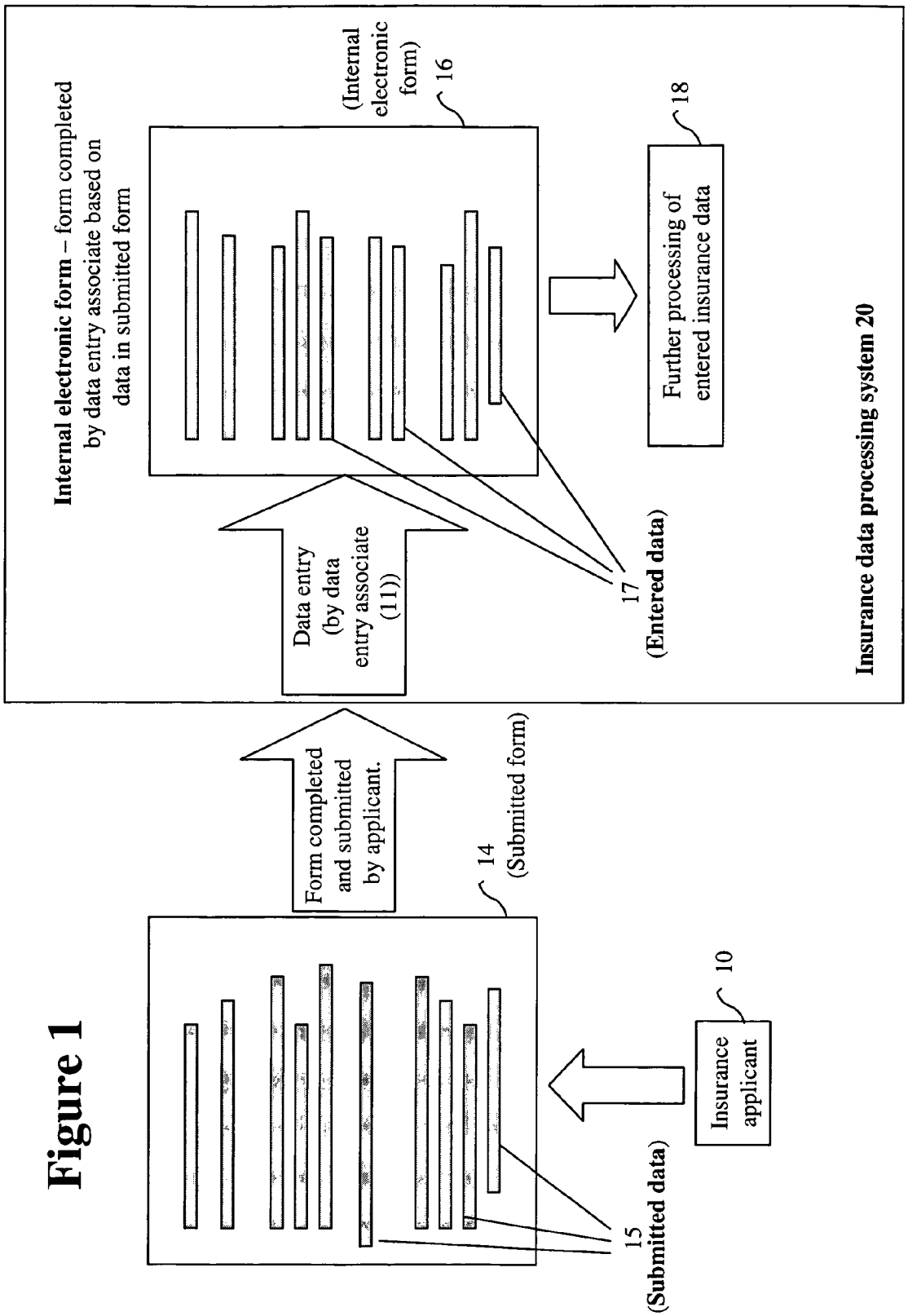
FIG. 1 is a flowchart showing a high level process in accordance with one aspect of the invention.

Hereinafter, aspects of a data collector in accordance with various embodiments of the invention will be described. As used herein, any term in the singular may be interpreted to be in the plural, and alternatively, any term in the plural may be interpreted to be in the singular. The various embodiments of the invention relate to systems and processes to collect data from a source of information, such as a paper document or other medium.

The invention provides a data collector that allows the transfer of information from a source of information, such as a paper document, to data. In accordance with one aspect of the invention, information relating to insurance, e.g., such as an application for insurance, is submitted for processing. This information is submitted via some medium, such as a paper document. The information will typically be entered into a computer system by a humane being, who might be characterized as a "data collector" or "data entry operator," for example. In the normal course of business, as should be appreciated, the data entry operator may very well be the only human being to ever physically examine the data. As a result, it is essential that the data collector allow the user, i.e., some other person later relying on the data, to identify missing, altered and/or unreadable pieces of information, for example, such that an automated system could react to that information. In addition, an effective system needs to prevent data entry errors "at the time of data entry" to the maximum extent.

To this end, the present inventors herein describe systems and methods to effectively input and manipulate data using a "form flow" approach and metadata. Illustratively, a variety of functionality is provided therewith including content sensitive logic features, field level mask capability and data validation function, for example. The provided system forces the user to enter only the necessary information and in the correct format. Finally, since data entry is often performed remotely using a client-server application, the system provides needed performance and response, which is typically very important in the selection of a data entry solution. Accordingly, a technical effect for the disclosed inventive technology is to provide systems and methods for performing a data entry process, as set forth in the Brief Summary of the Invention, above.

The invention embodies the concept of a "formflow". Such approach, as described herein, is in contrast to using an exact digital replication of a paper document to serve as a data collector, which is unsatisfactory to fully and efficiently capture information, as determined by the inventors. Instead, the formflow concept described herein allows free and logical navigation of the data collector to facilitate data entry. Essentially, the formflow serves as a digital "script" that guides the DEO, for example, through the data entry process in a predetermined manner, which is deemed by the designers of the script to be the most logical and/or efficient manner. Content sensitive logic is an integral part of the formflow concept. That is, certain data elements are presented to the DEO only when appropriate and relevant. Again, this logic is built into the formflow "script" to reduce screen clutter, eliminate distractions to the DEO, and to reduce opportunities for human error. Content sensitive logic features as described herein might be characterized as a feature that progressively discloses further fields (for the data entry operator to complete) based on the content of a field currently displayed.

In accordance with some aspects of the invention, a data collector is provided in the form of software. The data collector is used by a data entry operator to enter information from a source medium. The source medium might typically be a filled in document, which was completed by an applicant for insurance. However, the source medium might take on other forms, such a human verbally collecting information, for example. The document from which the information is taken might be a life insurance application or related document. However, this invention is not limited to just life insurance applications, but rather is directed to the collection of various types of insurance related data.

In accordance with various embodiments as described herein, the invention provides a variety of significant features, in conjunction with novel interrelationship between these features. One feature of some embodiments of the invention includes content sensitive logic, as noted above. The content sensitive logic functionality provides context sensitive logic, which examines what the data entry operator enters. The context sensitive logic, based on the particular input, presents one or a whole set of additional questions, for example. Further details of the content sensitive logic feature are described below.

Further, in the invention, the content sensitive features are utilized in a novel manner in combination with the capturing of metadata. In the capturing of metadata, the system assigns characteristics about the data that the data entry operator enters. For example the data entry operator might see that something has been altered on the original document, which they are keying data for. The data entry operator would still type in the altered information to the system. However, the data entry operator will make a notation that the data was altered. This notation allows the system to take action on this fact during later processing, as is necessary or desired. For example, there may well be significant legal implications if an altered signature or an altered medical detail would have changed the outcome of a particular case. In accordance with one embodiment of the invention, the invention allows this logic to be completely configurable to alert any number of people (i.e., such as a person or team) and/or result in a certain action, such as requesting a follow-up document, for example.

FIG. 1 is a flow chart showing the high-level process in accordance with one embodiment of the invention. The process starts with an insurance applicant 10 completing an insurance form, i.e., a submitted form 14, for example. On the submitted form 14, the insurance applicant 10 enters a variety of information. The information that the insurance applicant 14 enters on the submitted form 14 is herein characterized as "submitted data 15." Thereafter, the insurance applicant 10 submits a completed submitted form 14 to the insurance company or other entity, as is typical. At some point after the insurance applicant 20 submits the submitted form 14, the submitted data 15 is data entered into a suitable insurance data processing system 20 of the insurance entity, as shown in FIG. 1. This data entry may be performed by a data entry operator 11, as shown in FIG. 1. As used herein, a data entry operator means any person acting in the role of entering the submitted data 15. The data entry operator 11 retrieves various internal electronic forms 16, which are generated by the insurance data processing system 20. One embodiment of the invention uses barcodes on forms 14 that are read by the insurance data processing system 20 in order to retrieve the correct corresponding data collector and eliminate the possibility of data being entered on the wrong data collector. Based on the information in the submitted form 14, the data entry operator 11 enters various entered data 17 into the internal electronic form 16. The generation of the internal electronic forms 16 and features of the data entry are described in detail below. After the data entry operator 11 has entered the entered data 17, the internal electronic form 16 is then ready for further processing, as may be desired, as shown in step 18 of FIG. 1.

As used herein, the internal electronic form 16 means that the form is prepared internally to a particular entity, for example an insurance company. However, such meaning is clearly inclusive of the situation that the insurance company utilizes some affiliate entity to perform the data entry process, as described herein.

Figure 2:
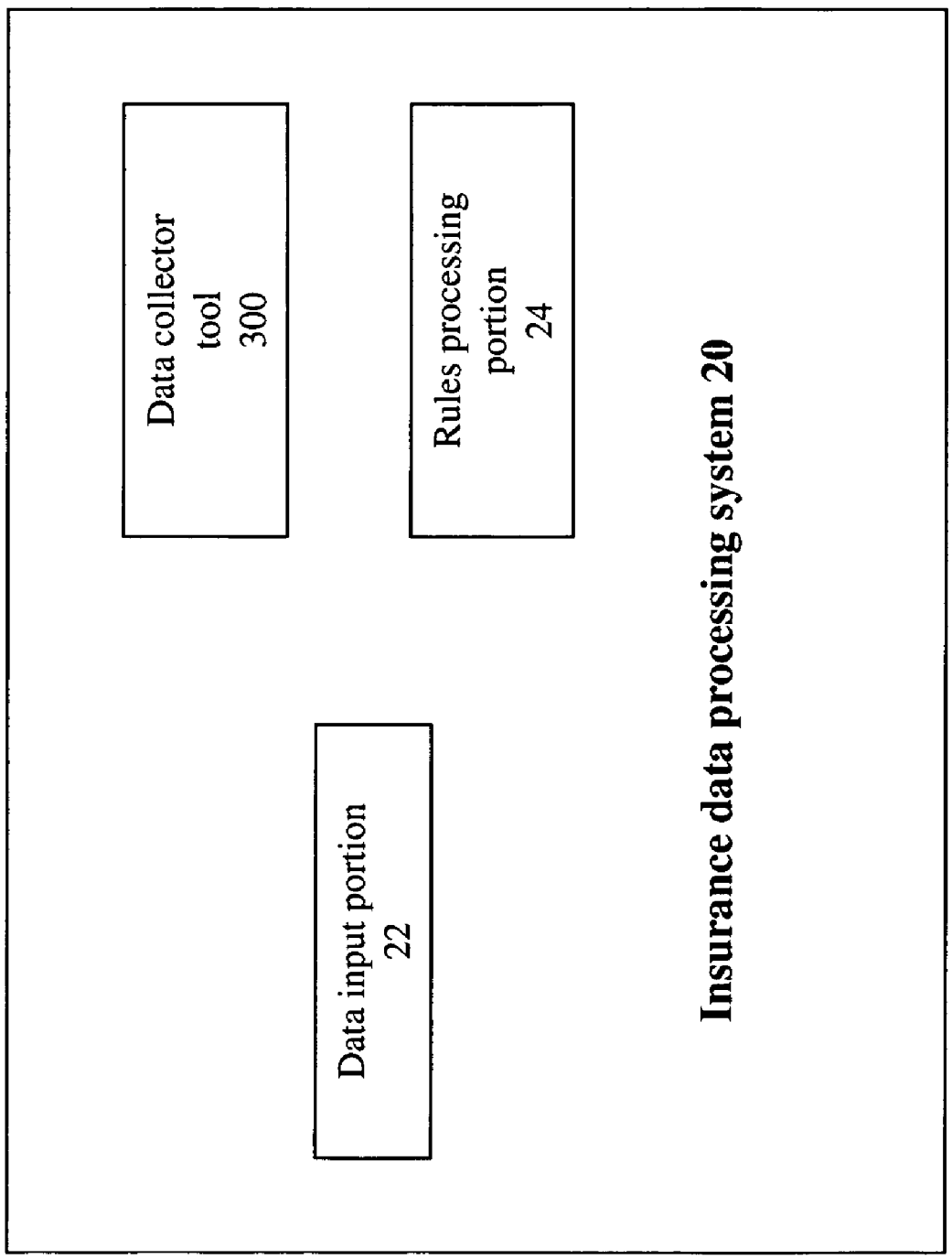
FIG. 2 is a block diagram showing an insurance data processing system in accordance with one embodiment of the invention.

FIG. 2 is a block diagram showing the insurance data processing system 20 in further detail, in accordance with one embodiment of the invention. As shown in FIG. 2, the insurance data processing system 20 includes a data input portion 22. The data input portion 22 inputs the submitted form 14 into the insurance data processing system 20 and prepares the submitted form 14 for review by the data entry operator 11.

Further, the insurance data processing system 20 includes a data collector tool 300 and a rules processing portion 24. The data collector tool 300 performs a wide variety of processing associated with data entry as performed by the data entry operator 11, for example. Further, the rules processing portion 24 shows one example of a component that may utilize the entered data 17. That is, the rules processing portion 24 may apply various rules against the entered data 17 so as to prepare an insurance policy, for example.

Figure 3:
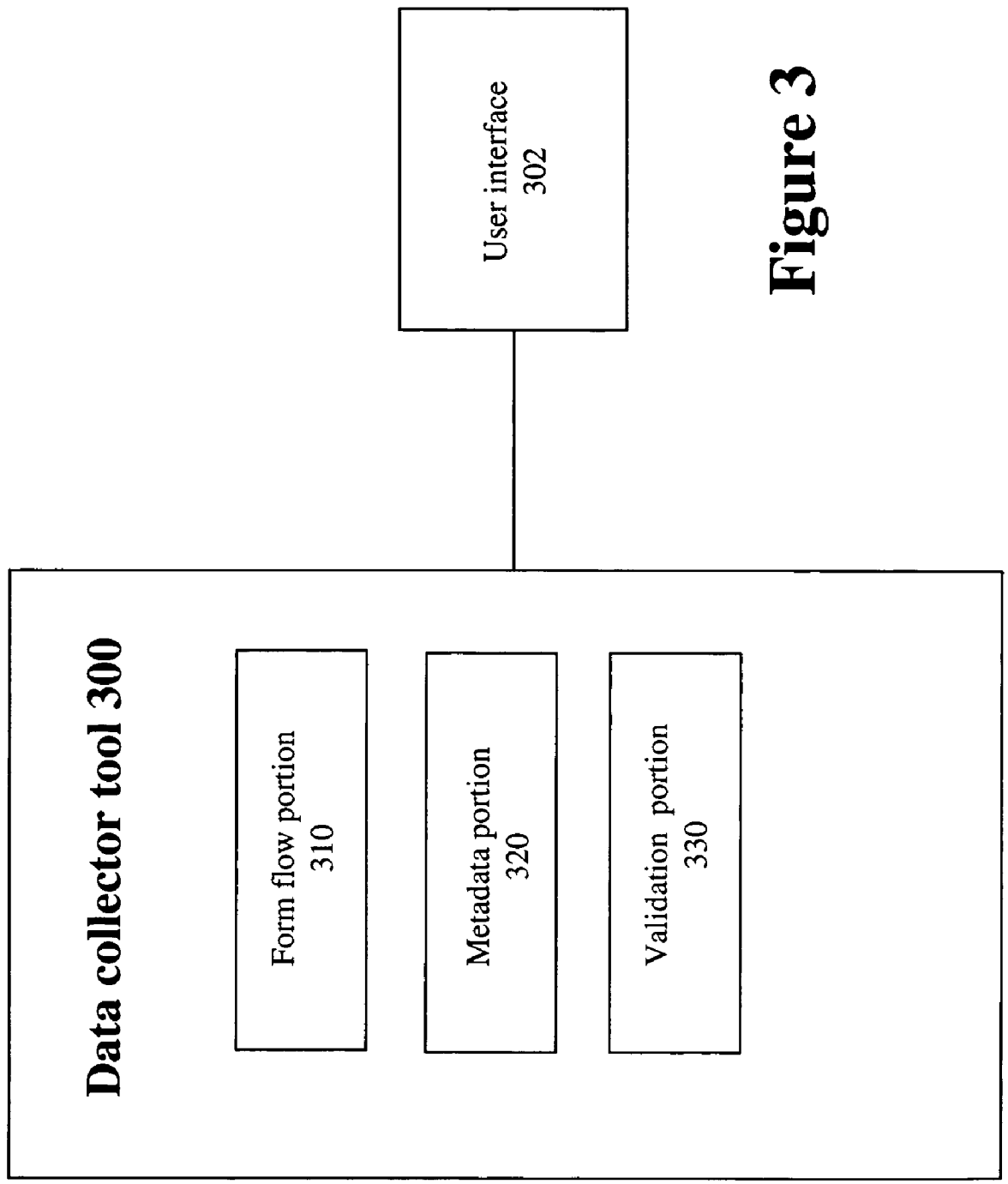
FIG. 3 is a block diagram showing a data collector tool in accordance with one embodiment of the invention.

In accordance with one embodiment of the invention, FIG. 3 is a diagram showing the data collector tool 300 in further detail. The data collector tool 300 includes a form flow portion 310, a metadata portion 320, and a validation portion 330. Further, the data collector tool 300 includes a user interface 302. The illustrative user interface 302 may interface with a data entry operator and/or an exception manager (EM), for example. As used herein, an "exception manager" is a person or machine who deals with submitted data 15 and/or entered data 17, which is deficient in some manner, i.e., such that the internal electronic form 16 needs further attention prior to processing an insurance policy, for example.

With further reference to FIG. 3, the form flow portion 310 performs various form flow processes, as described below. The metadata portion 320 generates various metadata regarding entered data 17, i.e., data that is entered by the data entry operator. Further, the validation portion 330 performs a variety of validation checks as described below. Such validation checks might be performed on a particular field in the internal electronic form 16 or on a page of the internal electronic form 16, for example. The operation of these various components of the data collector tool 300 are further described below.

In accordance with one aspect of the invention, the invention utilizes various metadata. It is appreciated that there are various types of metadata that the invention may process. One such type of data is altered data. Altered data includes the intentional alteration of content in a document. For example, an applicant "lines-through" an entry, "overwrites" an entry or effects a physical alteration of an application, such as "white-out", for example.

Another type of metadata occurs where a field is left intentionally blank." This "field left intentionally blank" metadata tells the system the data entry operator did not miss entering a field, but that the field was left blank on the original document.

Another type of metadata indicates that a field is "unreadable." Metadata indicating an unreadable situation is used when a field has been completed on the paper form but the data entry operator cannot determine what value has been entered on the document, for example.

Another type of metadata designates "data entry error." This metadata is assigned to an entry "after" initial data entry by the data entry operator 11, for example. Such metadata is designed to allow a subsequent operator, i.e., a non-data entry operator or data entry operator, to make a correction to a piece of data and to note that the correction was due to data entry error, and not for some other reasons, e.g., such as an alteration by customer request. For example a quality assurance person may notice that there is an erroneous entry from the data entry operator and fix that erroneous entry. This metadata will allow the system to recognize that the change was not applicant-initiated so as to avoid a subsequent acknowledgement of the change by the applicant (in the Insurance industry, this is known as a "signed amendment on delivery").

Another type of metadata is "failed mask (FM) metadata." This refers to data that should be formatted a certain way, but was not. For example, if the data entry operator (DEO) encounters a 10 digit social security number, such a number is not valid. However, it may be the situation that a legal requirement mandates that such data be keyed in exactly as the data is set forth on the submitted form 14, e.g., a submitted insurance application. Accordingly, the failed mask option will force the system to accept the keyed information, but will allow the system (or a person working in the system) to take further action later in processing since that data may have a problem. The system will first advise the DEO that the information entered is incorrectly formatted but will allow him to intentionally override the mask in order to accurately represent the data as received on the document.

Another type of metadata is "page level validation." Page level validation enforces the metadata requirements. After the DEO has completed a set number of predefined entries, the system will check to ensure that all the required entries either have data or that a "field left intentionally blank" metadata notation has been made. For example, sometimes fields are left blank by the person filling in the form because they either do not know the answer, don't want to disclose the information or simply just missed the question. If the DEO does not make some sort of notation on an empty filed, the system will not allow the data entry operator to submit the document until the data entry operator corrects the situation.

Figure 21:
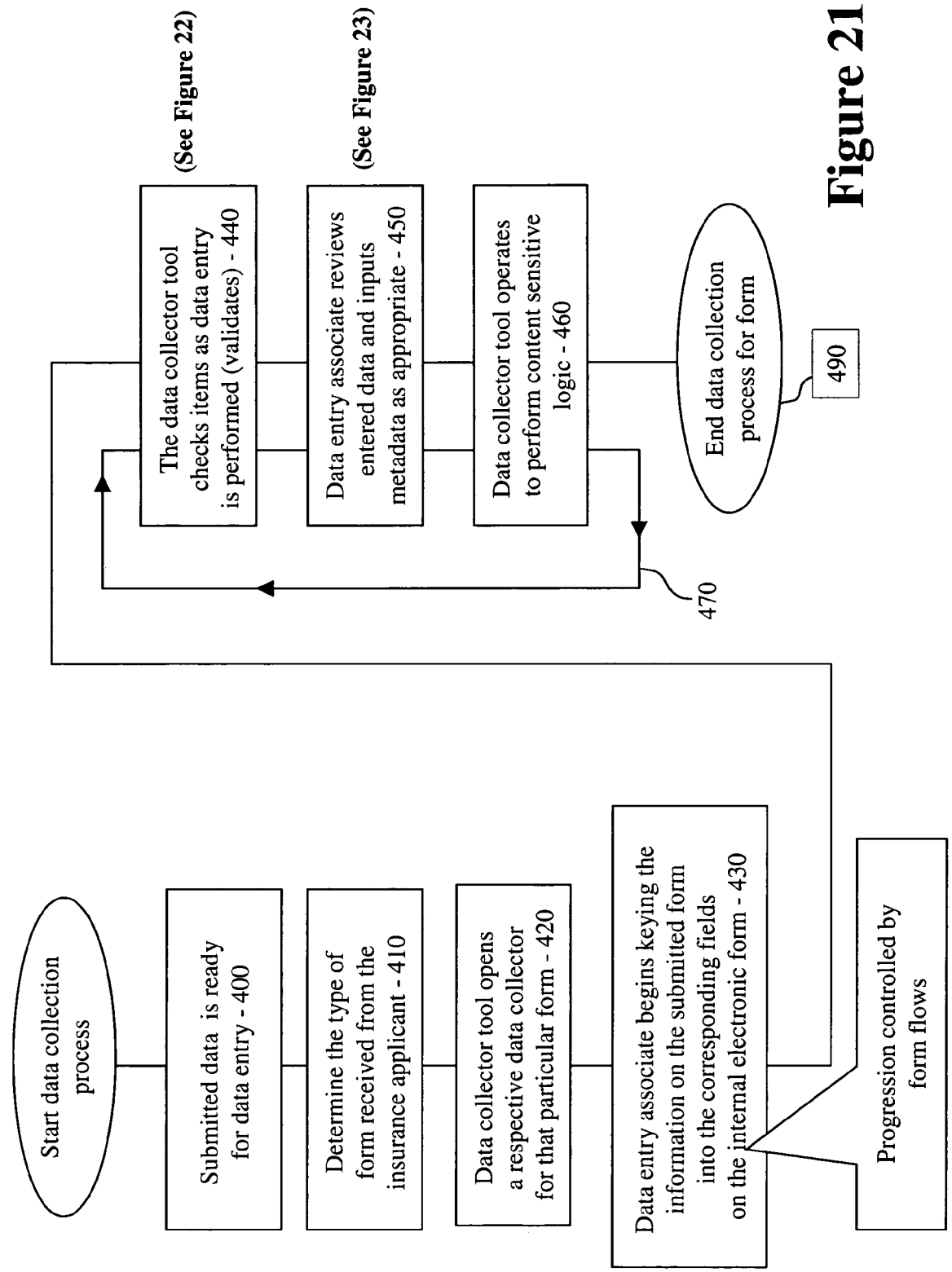
FIG. 21 is a flow chart showing a form flow process in accordance with one embodiment of the invention.

Hereinafter, further details of the various embodiments of the invention will be described. FIG. 21 is a flowchart in accordance with one embodiment of the invention showing further details of the general process shown in FIG. 1. The process of FIG. 21 may be performed by the data collector tool 300, in accordance with one embodiment of the invention. In accordance with one embodiment of the invention, the system automatically discerns the type of form 14 received from the insurance applicant 10. This might be done using a suitable form number, for example, or other identifying indicators, or associated with, the particular form, e.g., such as a bar code. Then, the system opens a respective data collector for that particular form. As a result, such processing eliminates the possibility of entering data on a wrong data collector. That is, the data collector tool as described herein might in operation rely on a plurality of programs or a plurality of program code modules. Different modules might be used for different forms, or even for different parts of the same form. Such an arrangement of identifying the submitted form 14 limits the occurrence of a wrong data collector being used for a particular form.

Thereafter, the Data Entry Operator (DEO) begins keying the information on the submitted form 14 into the corresponding fields on the particular form retrieved, i.e., on the internal electronic form 16, as shown in FIG. 1. As the data entry operator 11 types information into the data collector, the data collector tool 300 ( and in particular the validation portion 330) begins checking a variety of items. For example, the data collector tool 300 checks whether the data is properly formatted. The system performs this checking by using field-level "masks," in accordance with one feature of the invention.

Also, if the data entry operator observes that there is missing data on the original form, the data entry operator can still enter the other information and effectively complete entry of the data for the particular form. However, as to the information that is incomplete, the data entry operator makes an appropriate metadata notation through operation of the metadata portion 320, i.e., so that another person reviewing the data at a later time may know the nature of the data. This arrangement of course is in contrast to a system that either allows the data entry operator to send through a form with missing data, or alternatively, a system that would not allow the data entry operator to proceed to the next field or section as a result of the missing data.

With further reference to FIG. 21, showing further details of the data entry process, as shown in FIG. 21, the data collection process starts in step 400 in which submitted data is ready for data entry. Then, in step 410, the particular type of form that was received from the applicant is determined. This determination might be performed based on a bar code on the submitted form, for example. After step 410, the process passes to step 420.

In step 420, the data collector tool opens a respective data collector for that particular form. Then, in step 430, the data entry operator (data entry associate) begins keying the information on the submitted form into corresponding fields on the internal electronic form, i.e., through use of the form flow process, as described herein. That is, in step 430, the progression of steps through which the data entry operator enters data is controlled by a predetermined form flow, as described herein. After step 430, the process of FIG. 21 passes to step 440.

In step 440, the data collector tool checks items as data entry is performed. Further, in step 450, the data entry operator reviews entered data and inputs metadata as appropriate. Further, in step 460, the data collector tool operates to perform content sensitive logic. As can be seen by the iterative loop 470 of FIG. 21, the steps (440, 450, 460) are repeatedly performed as is necessary for entry of the data, Note also that the order of the steps (440, 450, 460) may of course vary. After step 460, the process passes to step 490, in which the process ends for that particular form.

Figure 22:
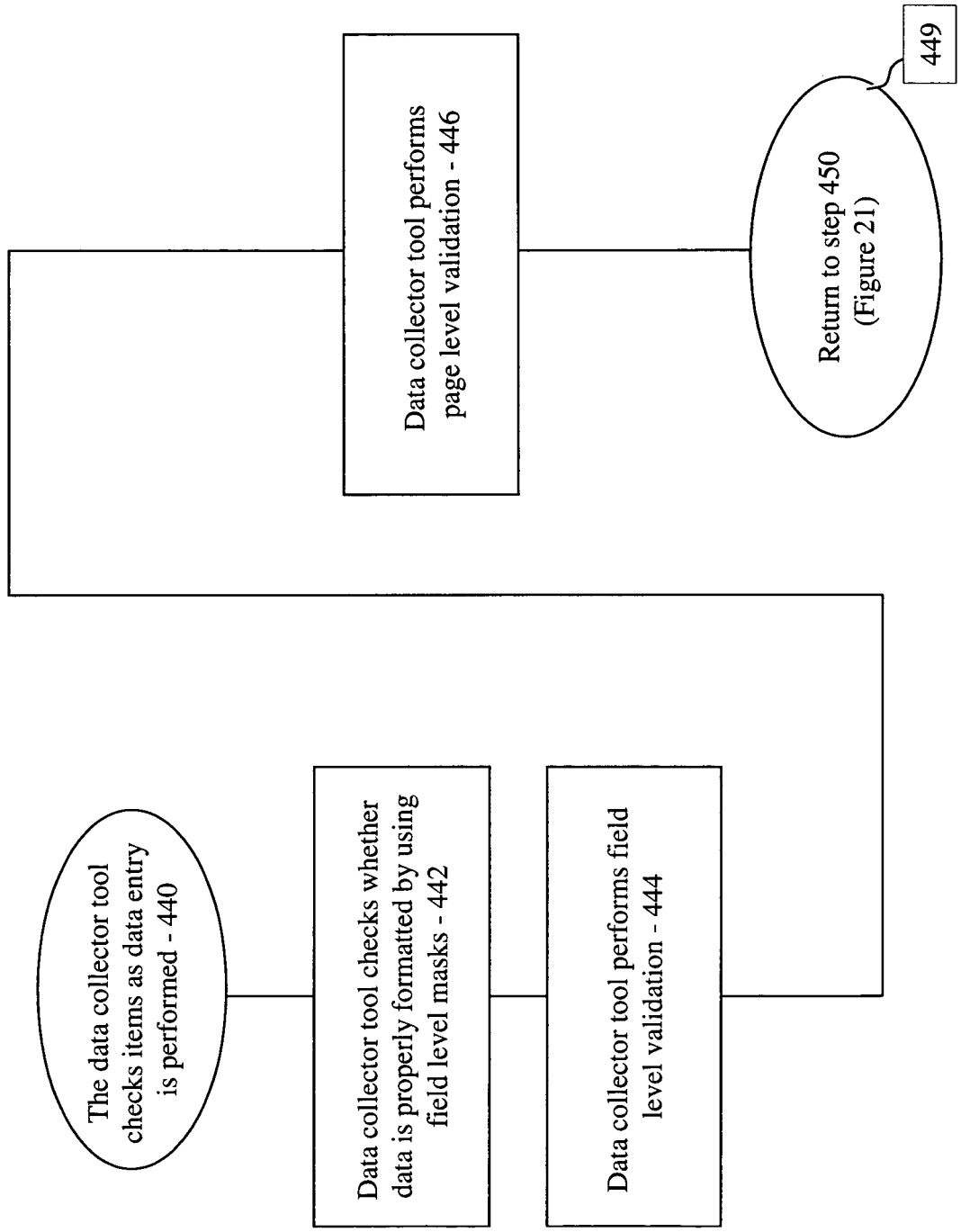
FIG. 22 is a flowchart showing further details of "the data collector tool checks items as data entry is performed" step of FIG. 21 in accordance with one embodiment of the invention.

FIG. 22 is a flowchart showing illustrative further features of the step 440 in which the data collector tool checks items as data entry is performed, in accordance with one embodiment of the invention. As shown in FIG. 22, the subprocess starts in step 440 and passes to step 442. In step 442, the data collector, and specifically the validation portion 330 in accordance with one embodiment of the invention, checks whether data is properly formatted using field level masks. Then in step 444, the data collector performs field level validation. After step 444, the process passes to step 446.

In step 446, the validation portion 330 of the data collector tool 300 performs page level validation. After step 446, the process passes to step 449. In step 449, the process returns to step 450 of FIG. 21.

Figure 23:
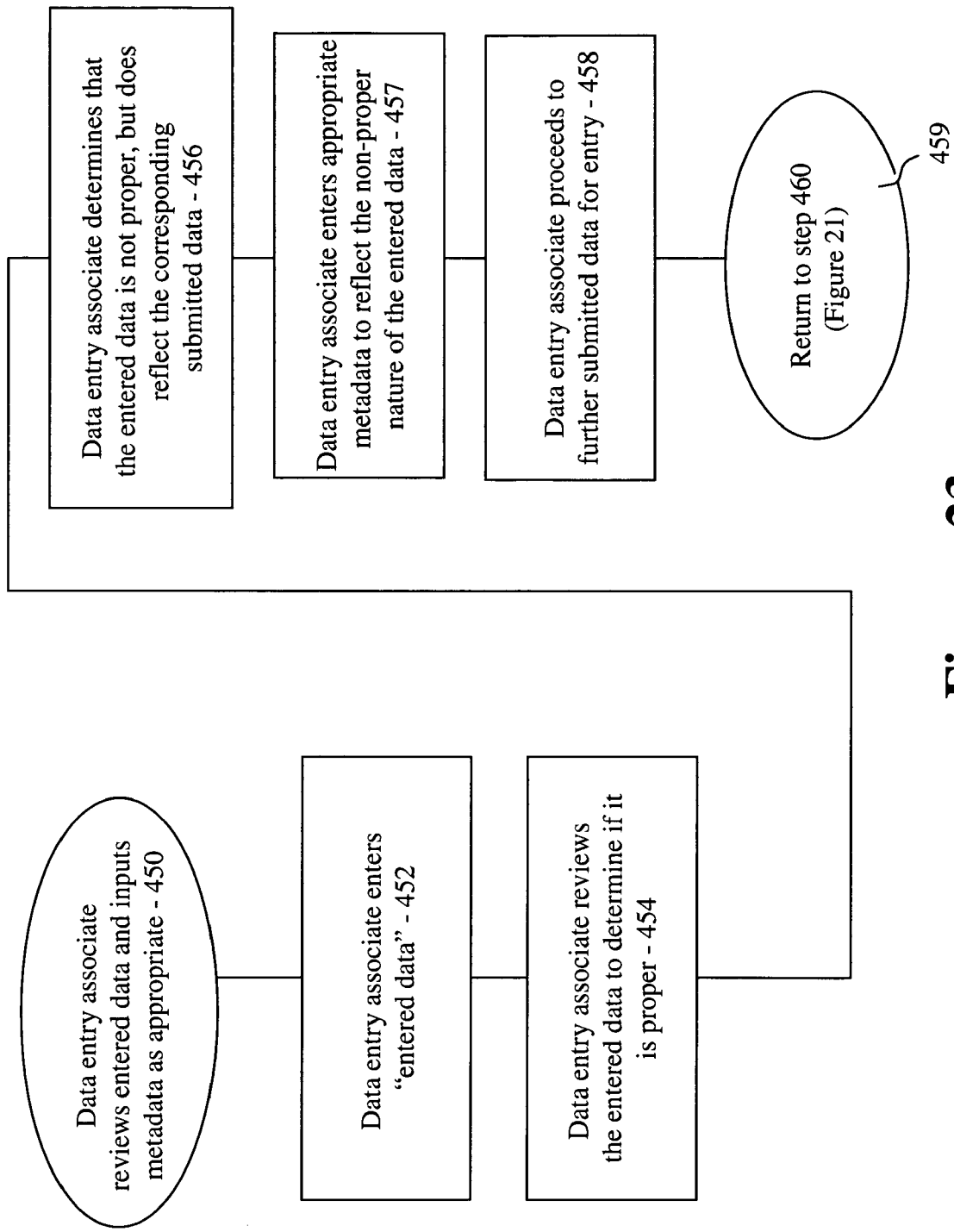
FIG. 23 is a flowchart showing further details of the "data entry operator reviews entered data to determine if the entered data is proper" step of FIG. 21 in accordance with one embodiment of the invention.

FIG. 23 is a flowchart showing illustrative features of "the data entry associate reviews entered data and inputs metadata as appropriate" step of FIG. 21. After the subprocess starts in step 450, the process passes to step 452. In step 452, the data entry operator enters data based on a submitted form. Then, in step 454, the data entry operator reviews the entered data to determine if the entered data is proper. Then, the process passes to step 456.

In step 456, the data entry operator illustratively determines that the entered data is not proper, but that the entered data does indeed reflect the submitted data. As a result, in step 457, the data entry operator enters appropriate metadata to reflect the non-proper nature of the entered data. This might be performed by changing the font attributes of labeling (associated with the particular field), for example. After step 457, the process passes to step 458.

In step 458, the data entry operator proceeds to further submitted data for entry. Note that this progression of step 458 is controlled by the form flow of the particular electronic form, as described herein. After step 458, the process passes to step 459. In step 459, the process returns to step 460 of FIG. 21.

It is be appreciated that, in completion of a particular form, if the data entry operator sends through missing data, such omission may not get noticed until further in the process. Substantial delays could then be caused at that later date in the processing. Further, without the system of the invention, if the data entry operator is forced to key something, they might make up the information just to get the document through. This could of course create compliance problems. By allowing the data entry operator to send through missing or incorrect information by noting it with Metadata, we ensure that problem data is addressed by the appropriate individual in a methodical manner.

In accordance with embodiments of the invention, a content sensitive logic is used, as discussed above with reference to FIG. 21. To explain, as the DEO is keying in information, some fields will cause the content sensitive logic to be activated. What this means is that on some fields, based on what is entered, additional questions or actions may be generated or requested, respectively. These questions or actions are fully configurable meaning that they can change depending on the particular content or value of a selected field, for example. One example, in the implementation of the method, is owner beneficiary information. In this example, the data entry operator selects the TYPE of owner of the policy. The type of owner of the policy can be either an individual, business or trust. If the data entry operator selects "individual," i.e., as a result of the content of the information the data entry operator is entering, the system generates a predefined set of questions. These questions, in this example, relate to an individual owner. On the other hand, if the data entry operator selected "trust", i.e., as a result of the content of the information the data entry operator is entering, the system would generate a different set of questions since the legal requirements for trust ownership are different.

The same type of logic could be used on such things as a car loan. If the car owner is an individual, the data collector tool 300 would ask some basic questions about their finances, for example. However, if a business was selected, different and more detailed questions would be required.

The content sensitive features as described herein eliminates presenting the DEO with every possible question and having the data entry operator decide what needs to be entered. Instead, the data collector tool 300 presents the DEO only with questions that should be answered, thus reducing the time it takes to data enter information and reducing opportunities for human error by entering information into the wrong fields. This content sensitive logic in conjunction with the use of metadata in the data collector tool 300 provides a powerful data collection tool.

In accordance with one aspect of the invention, as the DEO gets to a predefined break point, the data collector tool 300 will perform page level validation. In this step, the data collector tool 300 ensures all the required data and metadata has been entered. If there are any problems, the data collector tool 300 alerts the DEO to correct the errors. Though data validation could be performed solely at the field level, page level validation was designed specifically to improve system performance by reducing the frequency of "callouts" to the server.

When the DEO completes all the data entry, they simply submit the data. The system then performs a final validation check and sends the data to the next processing step. Based on system routing logic, the collected data may then be sent via workflow to a separate Quality Assurance Representative (QAR) or will be passed through the system for automated "back-end" processing.

In either case, any changes made to the entered data, would be noted in the metadata information that something has changed, i.e., through a person working with the metadata portion 320. This allows the entry of the data, as well as changes to the data, be fully auditable.

Also, before the corrections are made the user is presented with a list of changes about to be submitted and the user will either approve or not approve the changes. Another embodiment of the invention provides for complete recording of noted data entry errors by DEO for subsequent remediation/training.

In accordance with one embodiment of the invention, the invention further provides what might be characterized as validation using real-time call-outs. In this embodiment, the data collector tool 300, upon entry of particular data, identifies that data as being able to be validated based on contacting another system and/or database, for example. Illustratively, the system might identify a particular item of information as being an address. Accordingly, in this embodiment, the systems contacts, i.e., calls out to, the U.S. Postal Service to verify the address. This processing might be performed by performing a suitable search on the U.S. Postal Service web site or database to determine if a match is found for the address provided in the form. The results of the call-out, i.e., whether a match was found and the data was verified, is then contained in appropriate metadata. Relatedly, the invention may provide an address lookup feature, as is known. That is, the city and state fields may be auto-populated based on zip code.

In accordance with one embodiment of the invention, the system allows performance tuning or streamlining. In this embodiment, the data collector system is modified to make improvements based on user experiences in production. In one aspect, the progression of questions may be changed. Alternatively, unnecessary fields may be eliminated, for example. Such performance tuning may result from monitoring and recording data entry activity performed by the data entry operator, for example. Attention might be warranted on a field that consistently appears to slow data entry operators. Additionally, navigation within the formflow may be modified to reduce the number of keystrokes in an effort to expedite the data entry process.

In accordance with one embodiment of the invention, the system performs cross-population of repetitive data. As can be appreciated, there are several fields (on one or more forms) that appear more than once. The system identifies these fields as being the same and performs a cross-population of these same fields.

Hereinafter, various embodiments of the systems and methods of the invention will be described in further detail. In particular, aspects of implementations of various embodiments will be described.

In accordance with one aspect of the invention, in an insurance application process, data from an applicant may well be in the form of a hard copy document. This document, or another medium in which the application information is presented, may typically be considered a legally binding document. This presents a variety of challenges that are addressed by the processing of the data collector tool 300. Illustratively, all information written on the form should be entered into the data entry application exactly as submitted on the document. This is particularly challenging when information is written on the form incorrectly, or additional information is provided that is not typically found on a form. Further, all changes made on the hardcopy form should be noted as an alteration in the data entry application for later consideration. Also, information that is not readable should be noted for later consideration. Further, information missing from certain fields should be noted for later consideration. The metadata as described above is used to represent these various deficiencies. Further, other metadata may be used to represent other deficiencies.

As noted above, in accordance with one embodiment of the invention, the invention uses what might be characterized as content sensitive logic. The invention also uses "repeats." Due to the nature of paper form design, content sensitive logic and repeats are necessary to provide the flexibility needed to capture form information. However, extensive use of content sensitive logic and repeats can make form design very difficult and complex. Form flows can grow exponentially when adding a combination of these two capabilities in a traditional flow layout document. In order to efficiently document the form flows; the invention provides visual form flows that rely primarily on notes and comments to identify the use of content sensitive logic and repeats.

The invention further provides data mapping. That is, data presented in the form flows is mapped to the system. One methodology for identifying fields for mapping purposes has been based on a naming convention using form name, form section, and field User Interface (UI) label. An alternate or additional methodology may be required in the future for mapping form fields. Alternatively, or in addition to, the invention may use a numbering convention for fields. This may require more document maintenance, but would be beneficial for the purpose of consistently mapping fields.

The invention provides an arrangement that offers user-friendly forms that will enable the DEO to quickly and efficiently enter data. The DEO populates an electronic form by reading information found on a hardcopy form (or image) and manually typing such information into the electronic form. The disclosed data collection system facilitates navigation within each form by minimizing "mouse clicks" and maximizing the utilization of "tab" functionality, as is described below so as to allow the DEO to primarily use the keyboard.

In accordance with another embodiment of the invention, it might be the particular situation, that "all" the submitted data 15 on a submitted form 14 is not required on the internal electronic form 16. In this situation, another consideration in practice of the invention is the decision of what information needs to entered by the data entry operator. As can be appreciated, a variety of factors might impact this decision of whether data should be entered. In accordance with one aspect of the invention, various rules may be applied against the entered data, i.e., in the further processing of entered insurance data 18, as shown in FIG. 1. The data entry operator should of course enter all information that is needed to run these rules. Further, the entered data may well be used to print an insurance policy, for example. The data needed for a complete policy print should also be entered. Further, particular health conditions of a patient, e.g. HIV, may dictate that certain data be entered. As can be appreciated, some form data is required to be entered for legal reasons. On the other hand, some form data is not required for legal reasons and will not be processed in any manner. Accordingly, such information may not be required to be entered in accordance with this particular embodiment of the invention.

In accordance with a further aspect of the invention, various mechanisms or tools may be used in the operation of the data collector tool 300. Hereinafter, these tools are described. Thereafter, particular implementation of the various tools are described.

One tool that the invention may be provided with is an auto-population tool. The auto-population tool works off known or previously entered data so as to populate further identical data fields. For example, the data entry operator may retrieve a particular internal form for completion. The internal form is associated with a particular case number. The particular internal form may then be populated based on previously entered data for that case from another form. Alternatively, data that is entered onto an internal form a first time may be auto-populated onto further fields in the form requesting the same data.

Figure 4:
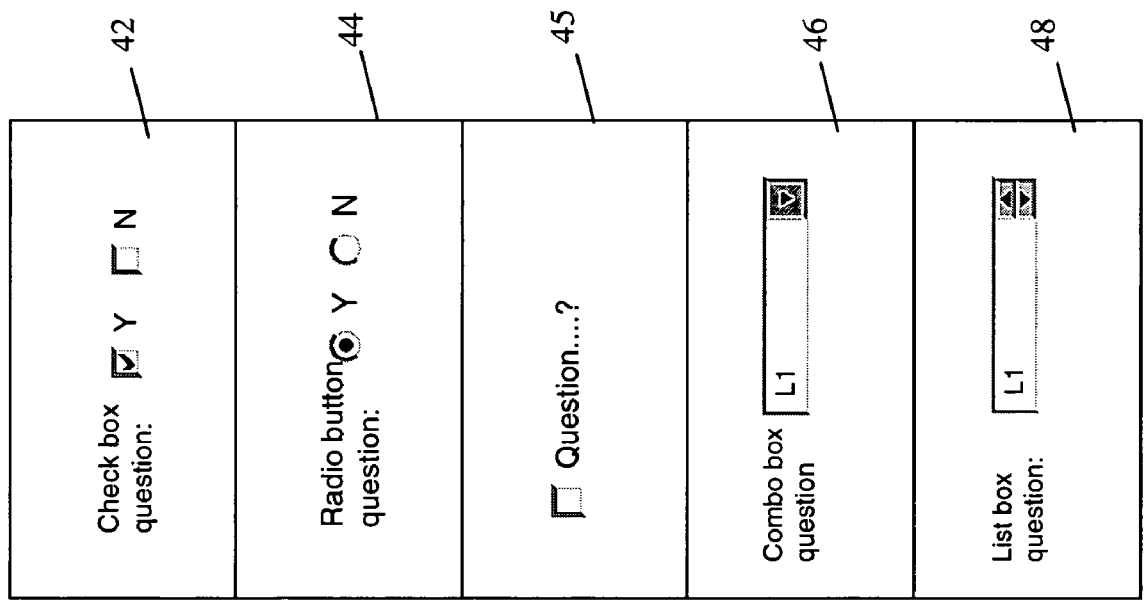
FIG. 4 shows examples of various questions in accordance with one aspect of the invention.

In accordance with a further aspect of the invention, check boxes 42 and radio buttons 44 may be used, as shown in FIG. 4. As is known, check boxes are similar to radio buttons, but their selection model, by convention, is different. Any number of check boxes in a group (none, some, or all) can be selected. A group of radio buttons, on the other hand, must have only one button selected. As can be appreciated, various criteria may influence when and how to use check boxes and radio buttons. Checkboxes might be used in the internal form wherever radio buttons are used on the submitted form. That is, check boxes provide much more flexibility than radio buttons. This added flexibility will enable the DEO to enter the internal electronic form exactly as shown on the submitted form. For example, a data entry operator can select both yes and no, or they can choose to select neither so as to accurately reflect the information set out on the submitted form.

However, the particular selection of radio buttons by the data entry operator of course affects validation of the internal electronic form. For example, the data entry operator can select both yes and no. However, the Yes and No checkboxes will be considered a group and will not pass validation if both are selected, in accordance with one embodiment of the invention. Accordingly, by default, checkboxes will be considered a selection within a group. This mocks a radio button grouping, while allowing the DEO to enter multiple checkboxes. However, in some cases, it may be necessary to set checkboxes as multi-select fields.

Another option is the use of radio buttons by the data entry operator. However, radio buttons result in a forced action for the data entry operator. This may not be desirable because the role of the DEO is to not be limited to a specific selection. Accordingly, in the practice of the invention, radio buttons might only be used for a question in which it is desired to force the DEO to answer only one item. Radio buttons are generally used to force the DEO to make a judgment about the data, not to capture data entered on the form.

Another option is the use of a "question" format 45. In accordance with one embodiment of the invention, this format is only used for form questions with on/off or yes/no type answers.

Further, the systems and methods of the invention might use combination boxes and/or list boxes. FIG. 4 shows examples of such combination boxes and/or list boxes. For example, combination boxes 46 might be used for questions where only one value can be selected. Alternatively, list boxes 48 might be used for questions where more than one value can be selected.

In implementation of combination boxes and list boxes, various guidelines may be utilized for creating values in lists. For example, a blank value may be placed at the top of all lists and set as the default value. A blank value does not set the blank attribute for the field. That is, it is appreciated that there is of course a distinction between the value of a filed (e.g. no value) and metadata about a field indicating that the field was left blank on the submitted form 14. Another guideline is to order lists in alphabetical order (including "Other" values). Alternatively, the lists might follow some logical order.

Figure 5:
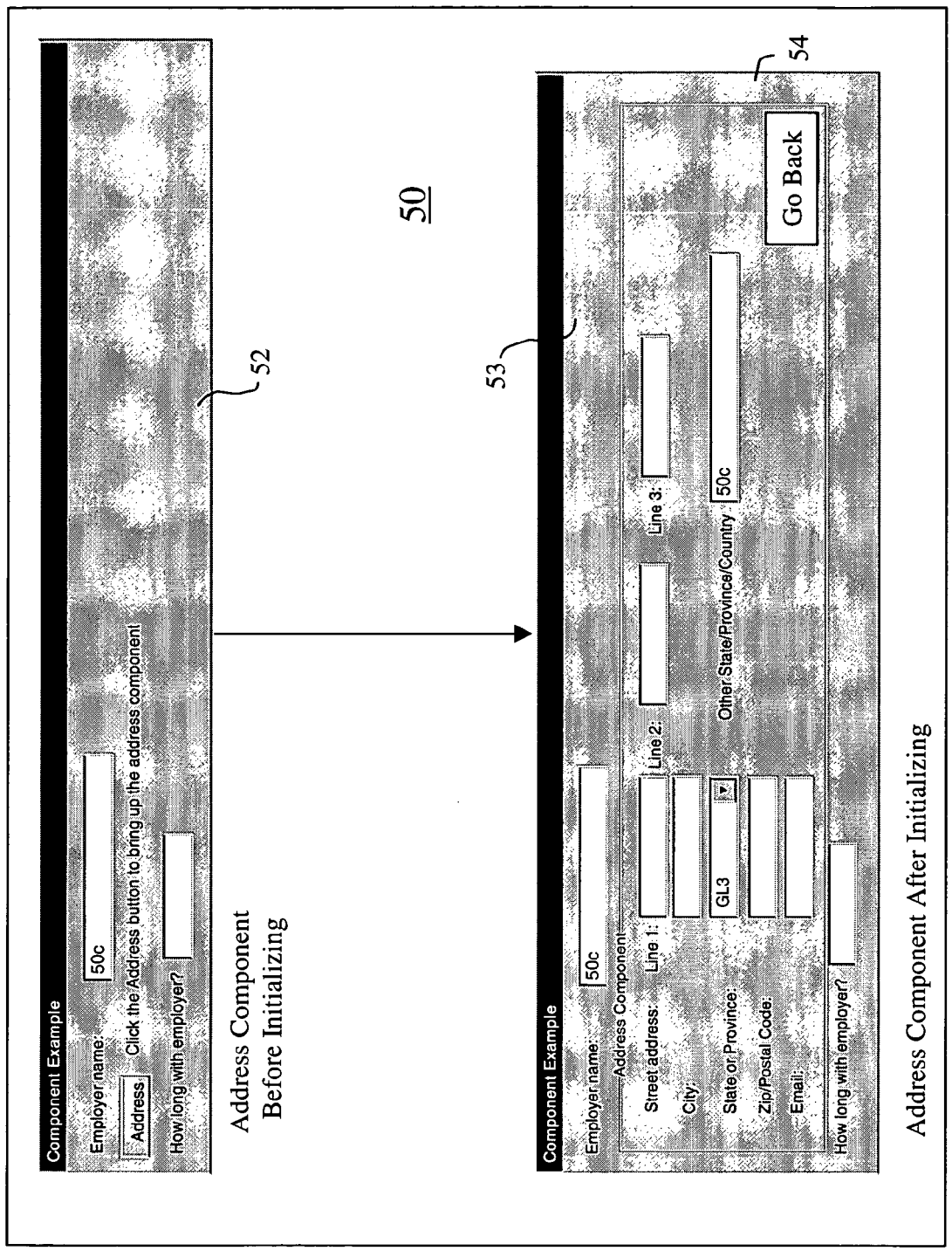
FIG. 5 is a user interface showing a component tool in accordance with one aspect of the invention.

In accordance with one aspect of the invention, the data collector tool 300 utilizes a tool that might be characterized as a "component." FIG. 5 is illustrative of a component tool 50. The component tool might be described as providing "hidden" flows. A component is displayed by pressing a button associated with the component. Examples of components are ADDRESS and SHARE. Once a component, i.e., the details of a component, is displayed the data collector tool 300 should provide the ability to remove the component, similar to remark flows.

As should be appreciated, various field labels may be used in the practice of the invention, i.e., so as to show the metadata, for example. Various considerations may be taken into account in the use of field labels. The labels may be positioned as desired. For example, it may be desired to place list box, combination box (i.e., combo box), and text box labels on the left side of the field whenever possible, or where necessary to place such labels above the field.

Further, various protocols might be used for Radio Button labels and Check Box Labels. For example, check boxes may be created according to how the question appears on the imaged form, i.e., the submitted form. A question label (showing metadata) may be used for groups of radio buttons. In addition, all checkboxes that are considered grouped for validation may be provided with a label (to show metadata about such grouped checkboxes). This label is where metadata elements are displayed. Illustratively, radio button labels may be placed on the left side of the radio buttons. Checkbox labels might be placed on the right side of the check box.

In accordance with one embodiment of the invention, field numbering might be utilized. For example, a separate number might be used for each field across all forms. Such a numbering scheme might be beneficial for performance tuning. Further, such numbering might be beneficial for global changes to the forms of an insurance entity.

In accordance with one aspect of the invention, field lengths and sizes play a large role in the input of data by a data entry operator. Field lengths are the amount of characters permitted within a field. Field size is the actual size of the field, but may still be measured in characters. It may be the case for the "field length" to surpass the "field size." In this situation, the additional characters will be stored for the field, but the additional characters won't be visible without scrolling.

Field lengths should be large enough to handle all possible answers for a particular flow. The field should be able to accept values that may be not be the standard length for a field.

The data entry operator should also be able to enter erroneous data, i.e., in conjunction with the use of metadata to reflect that such entry is incorrect. The field size should only be large enough to show the most common field sizes. EXAMPLE: SSN is actually 11 characters in size, 9 characters for number and 2 characters for the dashes in the mask. EXAMPLE: The imaged form has a 12-digit SSN number erroneously entered, for a total of 14 characters including the dashes.

Figure 7:
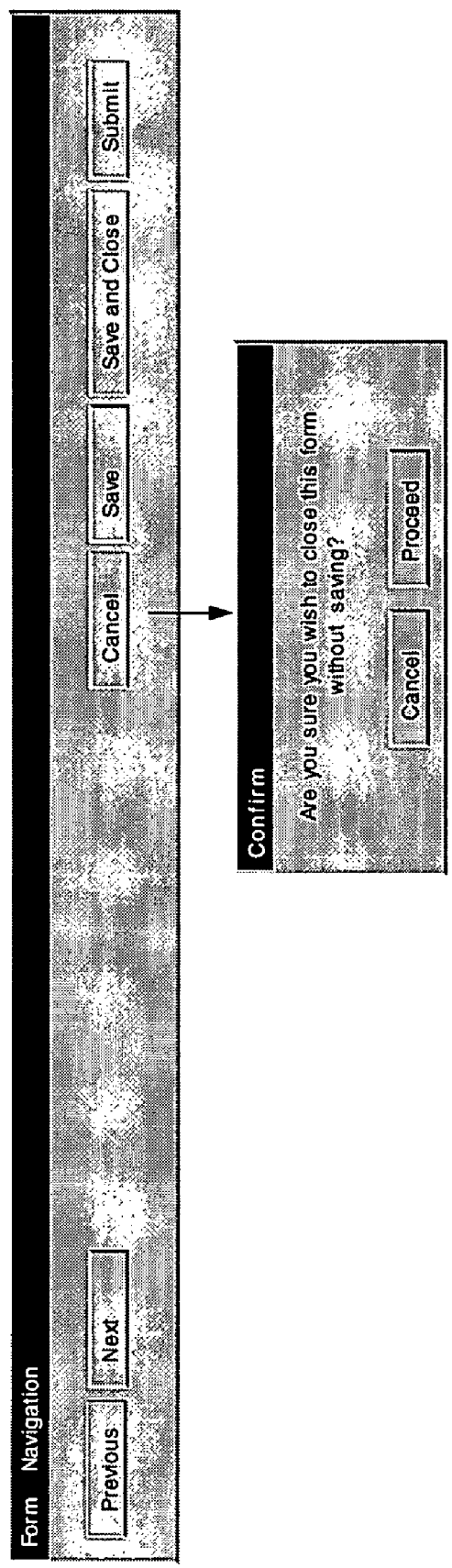
FIG. 7 is a user interface showing a basic example of manipulation of form navigation buttons in accordance with one embodiment of the invention.

In the implementation of the system, various navigation buttons may be provided to the data entry operator. FIG. 6 shows navigation buttons that may be provided on a data entry page. That is, FIG. 6 shows the button name, one illustrative placement of the particular button, as well as action that results from selection of the particular button. Further, FIG. 7 shows a basic example of manipulation of the form navigation buttons.

In accordance with one embodiment of the invention, the data collector tool 300 includes a "general comment" flow tool. A general comments flow is an individual flow that is associated to a particular form. This type of flow should be accessible to the data entry operator at anytime during the data entry process for its associated form. The purposes of general comments flow is to capture randomly entered information found on the imaged form, i.e., on the submitted form.

In accordance with one embodiment of the invention, "group boxes" may be used to group elements within a form flow. A title might be applied to the group box. Common usage for group boxes might include (1) to show sections within a form' and (2) to group progressively disclosed or repeating groups of elements.

In accordance with one embodiment of the invention, masking may be used. Masks provide many benefits to the data entry process. Masks simplify data entry by eliminating the need for the DEO to enter commonly used characters. For example, a mask may simply provide a template to accept entered data 17. Masks also standardize the data being entered such that the data can be structured for processing. Masks should not restrict the data being entered. Rather, masks should provide guidance for data entry. A field mask may be placed within a text box as desired. This will enable the DEO to see the characters populate the field in the correct mask. Examples of masks which might be used are described below.

In accordance with one embodiment and as described above, the invention provides a tool which may be characterized as a "content sensitive" tool. The "content sensitive" tool provides the ability to dynamically change the data collector flow based on user selections, e.g., selections made by the data entry operator. Content sensitive logic gives the ability to show the DEO fields on a "need to see" basis. Such arrangement significantly reduces keystrokes and reduces clutter on the screen, and as a result, increases the efficiency of the data entry process and reduces opportunities for human error.

Content sensitive logic is driven from the selection of buttons, checkboxes, radio buttons, and combo and/or list boxes, for example. Content sensitive logic can be one or multiple flows driven by a single question. Multiple flows give the ability to provide multiple paths or structures for data entry. FIG. 8 is a table showing examples of content sensitive logic in accordance with one embodiment of the invention.

In accordance with one embodiment of the invention, in the content sensitive processing, the data collector tool retains data in memory in a beneficial manner. To explain, data entered in a field or group (generated as a result of form flows and/or content sensitive logic) may be at jeopardy of loss if the DEO changes the value that disclosed the field(s). For example, the DEO might selects an "other" value in a combo box that disclosed and "other" field and then enters data into that field. The DEO might then change the value in the combo box, which now hides the "other" field. The DEO then might click back on the "other" value in the list. The data entered in the "other" text box should not be gone.

Accordingly, the data collector tool retains such data in memory. That is, data entered in progressively disclosed fields are retained in memory by the data collector tool. For example, the DEO selects a value in a combo box that disclosed several fields and then enters data into those fields. The DEO then changes the value in the combo box, which now discloses several new fields and the previously entered fields disappear. The DEO can then click back on the original selection to find that originally entered data is still intact. In accordance with one embodiment of the invention, this is necessary to ensure that a stray mouse-click does not accidentally cause significant data loss. Such arrangement also gives DEOs the ability to see fields, generated as a result of the content sensitive logic, from other selections without losing data.

However, it should be appreciated that data will indeed only be retained for a limited time. For example, in one embodiment, if the user leaves the current page, the previously entered information will not be available should the user return to that page.

In accordance with one aspect of the invention, a "remarks" or "details" flow might be utilized. Remarks and Details flows are used within the data collector tool to capture information provided within Remarks and Details sections of forms. For example, a "Remarks flow may be used to capture information that is specific to an individual question as intended by the form. Alternatively, any information that is not associated with a specific question is to be captured in "general comments," for example. As noted above, "remarks" and "details" may be used in the practice of the invention. In accordance with one aspect of the invention, "details" might be specifically for a particular question and may contain structured data elements. On the other hand, "remarks" constitute a free-form place in which the applicant provides additional free-text information, as they desire.

As can be appreciated, information specific to a question on a submitted form may be found in several locations on a submitted form. For example, the DEO could expect to find "Remarks" information in a combination of the following places on a submitted form, including circled, underlined, or otherwise altered text on a question, comments next to a question, text within the Details or Remarks sections of the imaged form, and/or text within the Details or Remarks overflow pages of the imaged form.

In accordance with one embodiment of the invention, all questions with an associated Remarks flow will have a Remarks or Details button. These buttons serve the same purpose of initiating a Remarks flow. The particular name that the button is called may be coined in some logical manner, i.e., so as to be easily associated with the corresponding information on the submitted form 14, for example. To provide flexibility and increased speed of data entry, users, e.g., a data entry operator, can click the details or Remarks button next to a question to immediately access the Remarks flow for a particular question. FIG. 9 is a diagram.902 showing an example of a question with a Remarks flow.

In accordance with one embodiment of the invention, each Remarks flow will have an associate metadata called the "Remarks Flag." This attribute identifies Remarks flows for a question as being either true or false. True means that remark content for a question should exist, which means that a Remarks flow and rules will be required for that Remarks flow. The default value for the flag is false. The flag may be set to "true" based on the following criteria, including (1) the DEO checks "Yes" or any other answer (i.e. "Totally Stopped Smoking") that requires an associated Remarks flow; (2) selecting a Remarks or Details button, and/or (3) selecting from the list of Remarks within the Remarks page. A user can reset this flag to "false" and remove all data within the remarks flow by selecting the remove button within each Remarks flow, in accordance with one illustrative embodiment of the invention.

Figure 10:
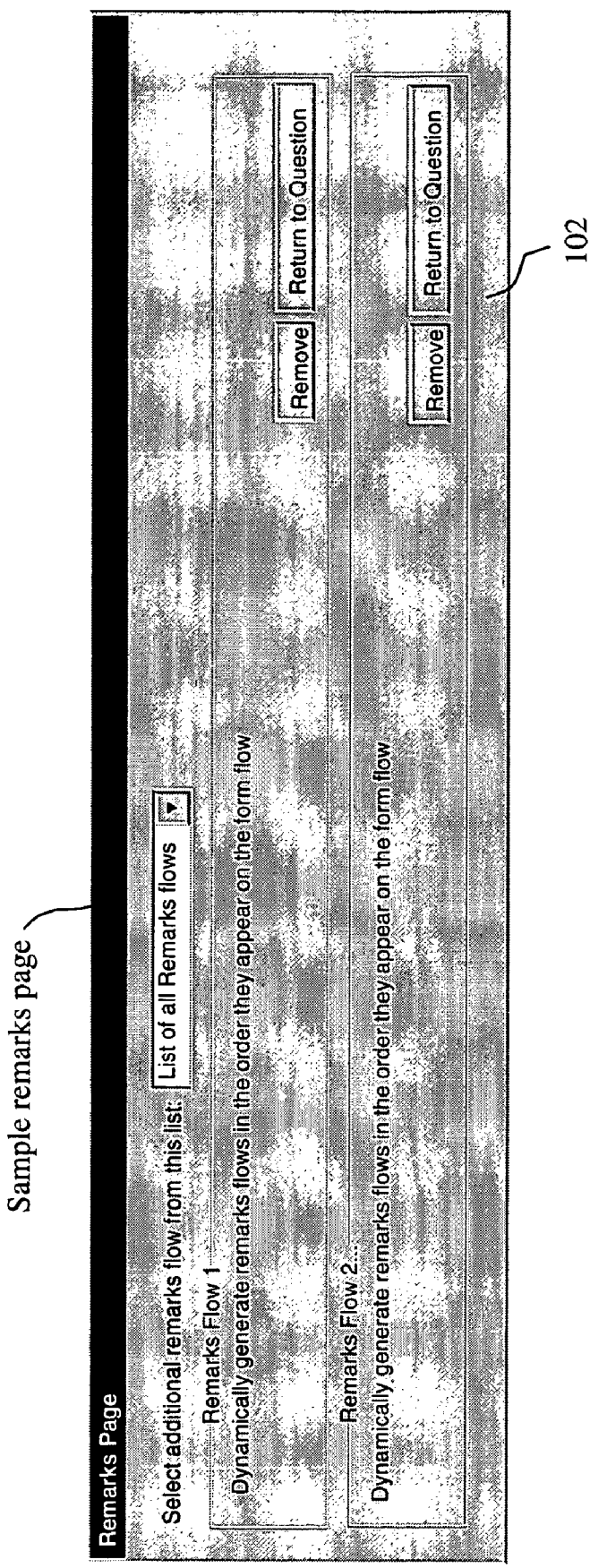
FIG. 10 shows a sample remarks page in accordance with one embodiment of the invention.

FIG. 10 shows a sample remarks page 102. The remarks page will be dynamically created for all flows with a Remarks flag value of true. These Remarks flows will be sorted in the same order as the questions on the imaged form. In addition the Remarks Page will contain a list box for all questions with an associated Remarks flow. The DEO can select from this list to add additional Remarks flows to the Remarks Page. Added Remarks flows will be inserted into the sorted questions in the Remarks page. The purpose of this is to capture Remarks for questions that had a "No" answer, but still provided Remarks in the Remarks section for the question. (For Example: a user answers no to the question, however, they feel it is necessary to enter a remark explaining their no answer). The drop down should appear again so the user can enter possible additional Remarks.

Figure 11:
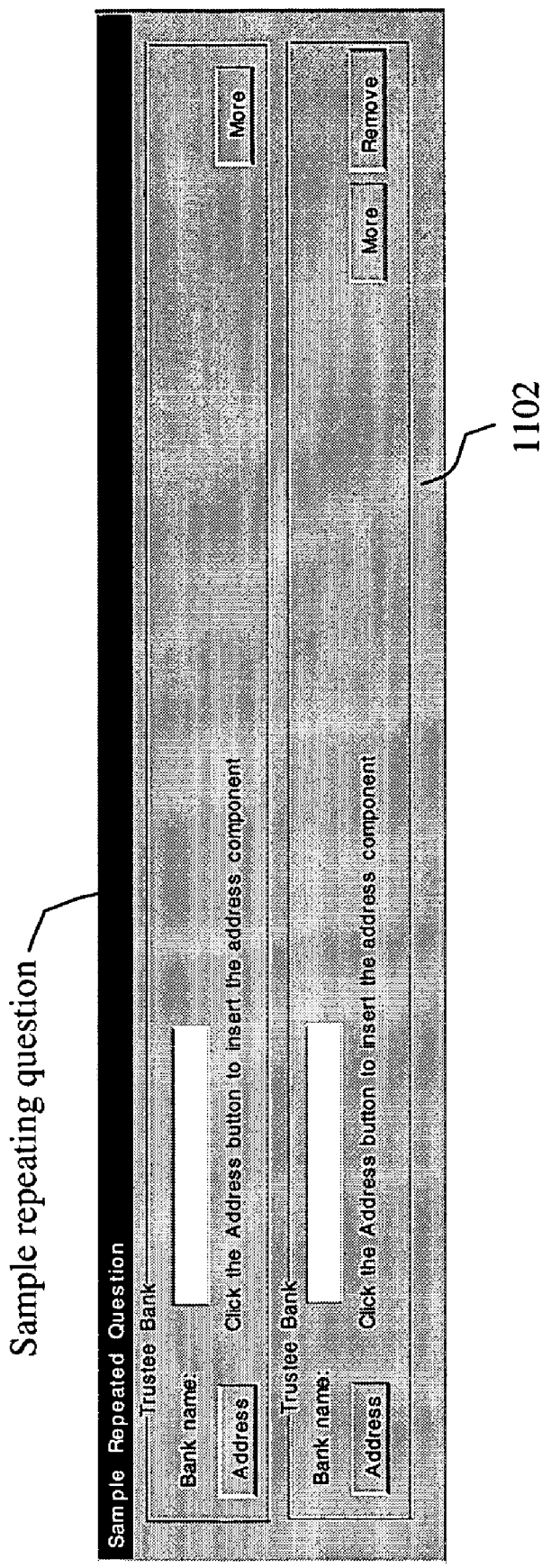
FIG. 11 shows a sample repeating question in accordance with one embodiment of the invention.

In accordance with one embodiment of the invention, a "repeat" tool 1102 may also be used, as shown in FIG. 11. Repeats are used within the data collector tool to capture repeated information under some circumstances. In accordance with one embodiment of the invention, a "MORE" button on the particular form indicates a "repeat" option. For example, the DEO clicks the MORE button to repeat a flow within a group box. All repeated flows may be provided with a REMOVE button to delete the repeated flow. To explain, two people might be listed on a submitted form. This information should be data entered, i.e., "data entered" meaning that the data should be entered. However, the electronic form only has room for one person's name. The "more" button is used by the data entry operator to repeat the name flow for that person.

Figure 12:
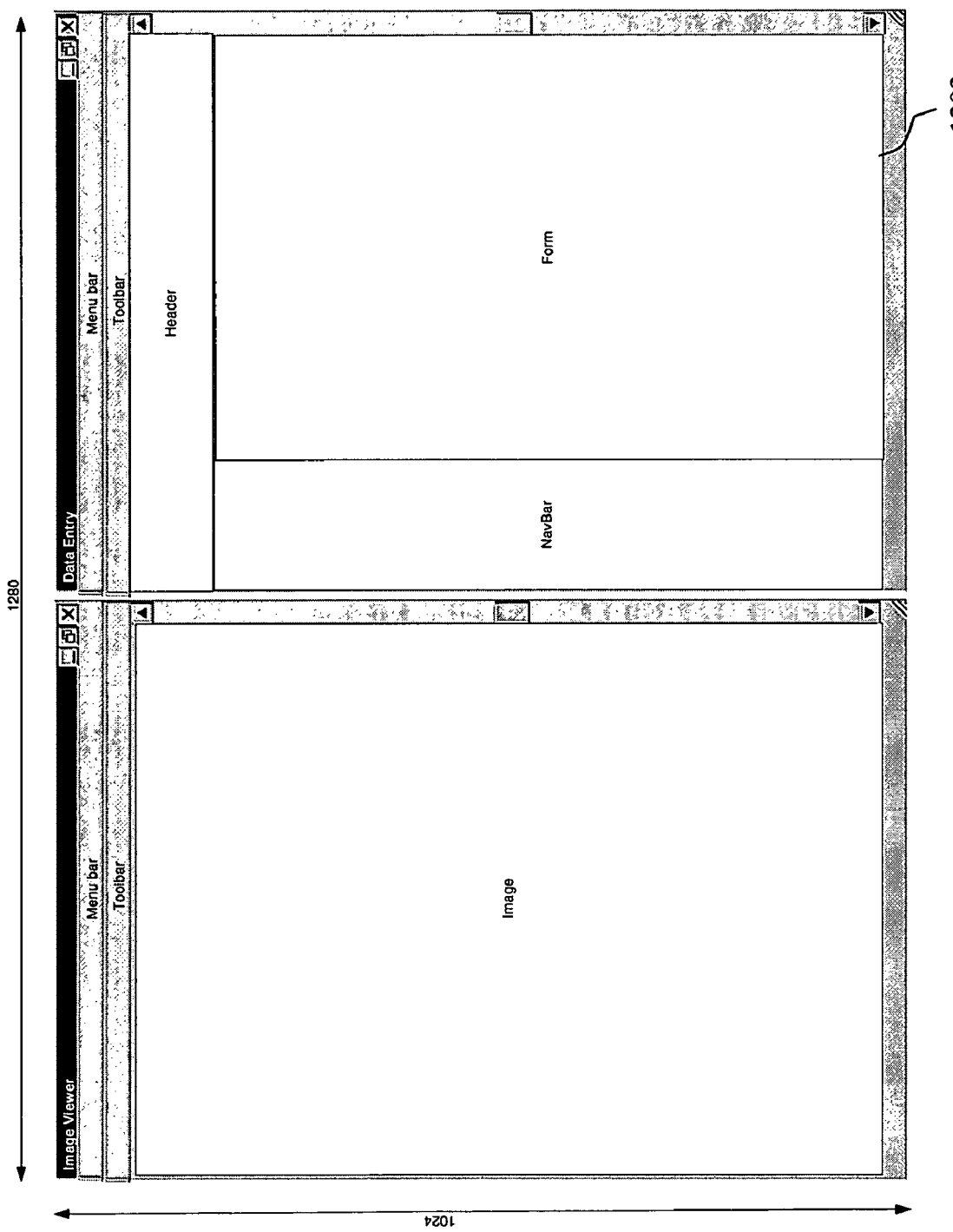
FIG. 12 illustrates an illustrative screen layout in accordance with one embodiment of the invention.

It should be appreciated that a variety of screen layouts might be utilized in implementation of the data collector tool. The particular format of the screen layouts will of course depend on particular system requirements, as well as preferences of the intended users. FIG. 12 illustrates a screen layout 1202 in accordance with one embodiment of the invention.

In accordance with one embodiment of the invention, signature verification may be utilized. Signature verification may be used to determine the legal validity of an application. Both the DEO and the exception manager (EM) may perform signature verification.

The DEO may perform an initial signature verification, as shown in the user interface 1302 of FIG. 13. This initial verification might be performed by the data entry operator comparing the signature on the submitted form to the name on the submitted form. The purpose of this review is to ensure that (1) the document is signed, and (2) the signature matches the printed name on the document.

Further, the exception manager (EM) may perform a second pass of the verification when they receive a manual task. To clarify, the data collector tool 300 may perform some tasks automatically as a result of a deficient submitted form 15. For example, the data collector tool 300 might forward a supplemental form to the insurance applicant 10. On the other hand, some tasks may be manual and designated for the EM, e.g. such as the signature verification. That is, the EM may receive samples of tasks to perform signature verification. The purpose of this review is to validate the authenticity of signatures. Specifically, the EM may check whether the signature on different parts of a submitted form (or on different forms) match. The intent is to detect fraudulent signatures prior to issuance of the policy to the applicant. In accordance with one embodiment of the invention, this verification will appear as a task in an EM queue. The User Interface will present a side-by-side representation of signature images for visual comparison.

DEO signature verification may be performed at a detailed level and a normal level. The level of verification required is based on the current practice. The signature verification might be characterized as either a detailed verification or a normal verification. A "detailed" verification is necessary for signatures that significantly impact the legal validity of the policy. Alternatively, in some cases, a quick check to determine if a signature is present is sufficient. This is considered a "normal" verification. FIG. 13 is a user interface showing examples of both a detailed and a normal signature verification user interface.

In accordance with a further aspect of the invention, various validations may be performed during operation of the data collector tool, and in particular by the validation portion 330 of the data collector tool 300. For example, the data collector tool might perform what is characterized as a front-end validation, as well as a back-end validation. The front-end validation occurs during the data entry process within the data collector tool. In contrast, the back-end validation occurs during rules processing. The purpose of front end validation is performed to enforce data integrity so that the rules engine can process the data. Both front-end validation and back-end validation uses metadata, i.e., attributes of the entered data, for validating forms. In one aspect, validation forces the DEO to either correct a field or set attributes for a field, i.e., reflecting incorrect entered data. Validation might be performed by the processing system at the field level and/or the page level, as is described below.

With the above described aspects of the processing system in mind, hereinafter further details of the use of "attributes" of the entered data will be described, i.e., the use of metadata will be described.

In accordance with one embodiment of the invention, each form flow field should have the ability for the user to set field level attributes. These attributes are stored as field specific metadata in a suitable database. The processing of the entered data (i.e., processing of the internal electronic form) in the rules processing portion are dependent on the content of fields and their associated metadata. The details of a variety of attributes are described below with reference to the table 1402 of FIG. 14.

Radio buttons and check boxes may be set at the question group level. This may require that the particular metadata apply to the question, and not answers to the question. The user can set this attribute while tabbed into any of the radio buttons or check boxes within the question, or in some other suitable manner In particular, FIG. 14 shows various attributes, i.e., metadata, that may be used in operation of the data collector tool. Further, FIG. 14 shows examples of how the respective attributes might be activated. Lastly, FIG. 14 shows the manner of identification of each respective attribute, i.e., with the use of font attributes. Further aspects of FIG. 14, and the attributes set forth therein, are described below.

One attribute is metadata to show an altered field. This attribute identifies fields on the imaged form that have been altered in some way. The attribute can be applied to all fields in a form or groupings of checkboxes, for example.

Another attribute is metadata to show a blank field. This attribute identifies fields on the imaged form that have been intentionally left blank. The attribute can be applied to all fields or groupings of checkboxes in a form. Blank field attributes may set by a manual hot key selection, for example, or other suitable user interface option.

Another attribute is metadata to show an unreadable field. This attribute identifies fields on the imaged form that are unreadable by the DEO. The attribute can be applied to all fields in a form. Unreadable field attributes are set by a manual hot key selection or other suitable user interface option.

FIG. 14 also shows various other types or metadata described below. As should be appreciated, such metadata may be activated in any suitable manner, as is desired. Also, as shown in FIG. 14, various font variations (including colors)

are used to identify a particular attribute. However, any suitable identification might alternatively be used to identify the metadata.

In accordance with one aspect of the invention, it should be appreciated that metadata might be needed by the data entry operator, for example, for a particular field or for a group of fields. Illustratively, checkbox groupings might be defined according to business needs, as desired. In some cases, it may be desired that metadata be applied to each individual checkbox. On the other hand, other occasions may require metadata at the checkbox group level. In accordance with one embodiment of the invention, by default, metadata attributes are applied to groupings of checkboxes. Given this default, the data entry operator, for example, should specifically indicate on the form flow any checkboxes that should have metadata applied directly to the checkbox, rather than the grouping. Relatedly, such individual checkboxes would need to be provided with their respective labels.

It should be appreciated that it might be the situation that a field may be provided that is not specifically identified with a label. As described above, the particular font attributes of the field label is what conveys the attributes of the entered data. For example, fields without labels sometimes occur when they are structured in a table type format. However, entered data should have the capability to be associated with metadata. Various approaches might be used to associate entered information with metadata. The particular approach to capture the metadata should be reflective of the particular business need.

For example, metadata might be applied to the row level. If no row label is available, suitable indications, such as a "*" might be used as a row label. On the other hand, if row level labeling is not possible, the metadata may be applied to the field level, i.e., a label might be associated with the field level. Labels may be created next to each field to which metadata is applied. Further, an "(A), (B), ( . . . )" may be added to each field or grouping of fields within a row. Further, page level validation should have more than an "*" displayed for each field, in accordance with one embodiment of the invention. The developer might create the label in the page validation based on a combination of table name and row/column information for each field, for example. Labels associated with fields may be created as is desired or necessary.

With further reference to FIG. 14, another type of attribute is "unreadable data." For example, unreadable data might indicate a Failed Checkbox Combination. To explain, a failed combination occurs when groups of checkboxes are set incorrectly. Failed combinations are identified with the Unreadable Attribute. For example, the DEO might select both Male and Female check boxes for a gender question. The DEO or the UI will identify a failed combination by setting the checkbox group as unreadable. This will occur in all groups of check boxes unless the groups are specifically set as multi-select.

Another attribute is failed mask fields. This attribute identifies fields on the data collection form that have failed the masking for a field. This attribute may only be applied to text fields with masks and may be set only by the system.

Further, as shown in FIG. 14, metadata may be provided that is reflective of multiples types of metadata, as described above. That is, an attribute might be "altered and blank"; altered and unreadable; and/or altered with a failed mask. These attributes may be activated separately, or collectively, in some suitable manner.

Hereinafter, aspects of data validation will be described. In accordance with one embodiment of the invention, field level validation may be utilized. Field level validation applies to blank/unreadable fields, masked fields, and failed checkbox combinations, in accordance with one embodiment of the invention.

With regard to Blank/Unreadable Fields, in accordance with one embodiment of the invention, blank and unreadable fields are validated immediately upon exiting a field with a blank or unreadable attribute. FIG. 15 is a table 1502 that describes conditions in which a validation query is presented to the data entry operator or other user due to contradictory entries. That is, for example, FIG. 15 shows a particular condition that will prompt a validation query, as well as an illustrative message conveying the validation query.

Figure 16:
FIG. 16 is a user interface that shows a generic mask error query to a data entry operator in accordance with one embodiment of the invention.

Validation may also be performed on masked fields. That is, masked fields are validated immediately upon exiting a field with a mask. In accordance with one embodiment of the invention, a popup window will appear upon exiting a field that failed its mask validation. FIG. 16 is a user interface 1602 that shows a generic mask error query to a data entry operator. Further, FIG. 17 is a table 1702 that lists illustrative masks, which may be used in operation of the data collector tool 300.

Further, in accordance with one embodiment of the invention, failed Checkbox Combinations are validated immediately upon exiting a grouping of checkboxes that fails a combination check. Failed combinations occur in groupings of checkboxes where only one check box should be selected. A popup window will appear upon exiting a field with a failed combination. FIG. 18 is a user interface 1802 that describes a particular condition that a field has "failed the checkbox combination" and the resulting "failed combination" validation window.

Figure 19:
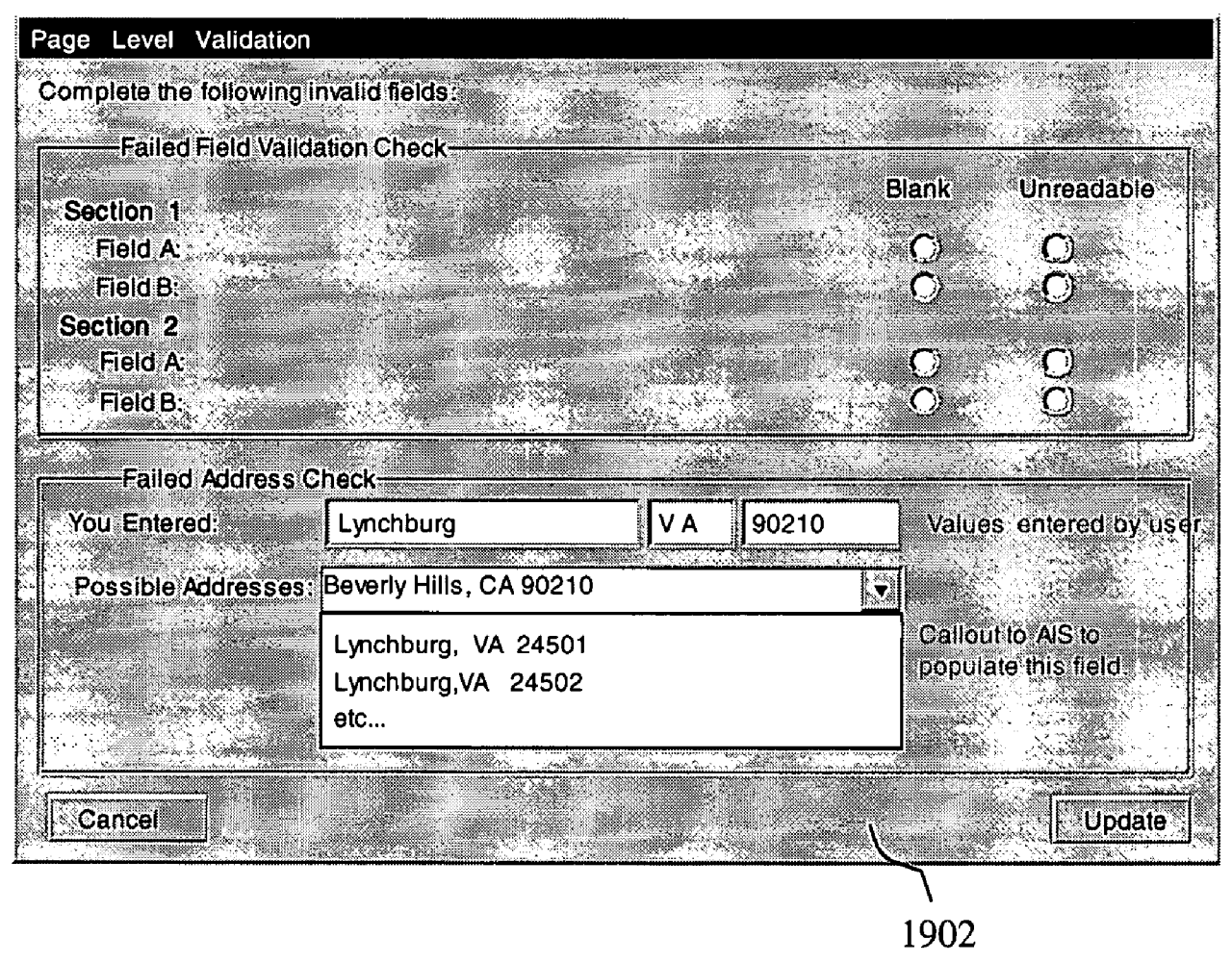

In accordance with one embodiment of the invention, page level validation may be performed, as illustrated by the user interface 1902 of FIG. 19. Page level validation occurs as a result of any action resulting in the exit of a page (i.e. submit, next, close, etc.), i.e., page level validation occurs whenever a page is exited. The data collector tool, and particularly the validation portion 330, may perform various checks of a page upon exiting from that page.

Illustratively, the data collector tool will pop up a window listing all fields of a page (that fail a validation check) having a condition of an empty field (including drop lists with the default blank value), with no blank or unreadable attribute set and that have not been data entered, i.e. no characters. Another condition that will result in page validation failure is: a failed combination of checkboxes with no unreadable attribute set. A further condition that will result in page validation failure is: a failed address lookup, i.e., when the data collector tool could not validate a given address based on external databases, for example.

In accordance with one embodiment of the invention, the page level validation window 1902 forces the DEO to apply attributes to fields that fail a validation check. The DEO can edit blank and unreadable attributes for each field in the "Failed Field Validation Check" grouping. In accordance with one embodiment of the invention, all fields in page level validation default to the "Blank" attribute.

In accordance with one embodiment of the invention, the page level validation window will also dynamically include a section called "Failed Address Check" in the situation where a failed address is detected, as noted above. In this situation, the data entry operator will have the ability to select from a list of generated addresses based on current address data. The DEO will have the ability to manually (via hotkey) set the address fields as blank or unreadable if the DEO can't find a suitable address from the generated list.

FIG. 19 shows an example of a page level validation window. Upon completing each field the DEO will press UPDATE. The system will then process one of the following conditional requests. (1) If the DEO set an attribute for all fields, then update the form and process the original request. (2) If the DEO missed a field intentionally or mistakenly, then update the form and return the DEO to the page for completion of missed fields. This will allow the DEO to return to the form to fill in missed fields. In accordance with one embodiment of the invention, the form will hi-light all fields not updated by the DEO. In this manner, the DEO can see which fields she still needs to complete.

Figure 20:
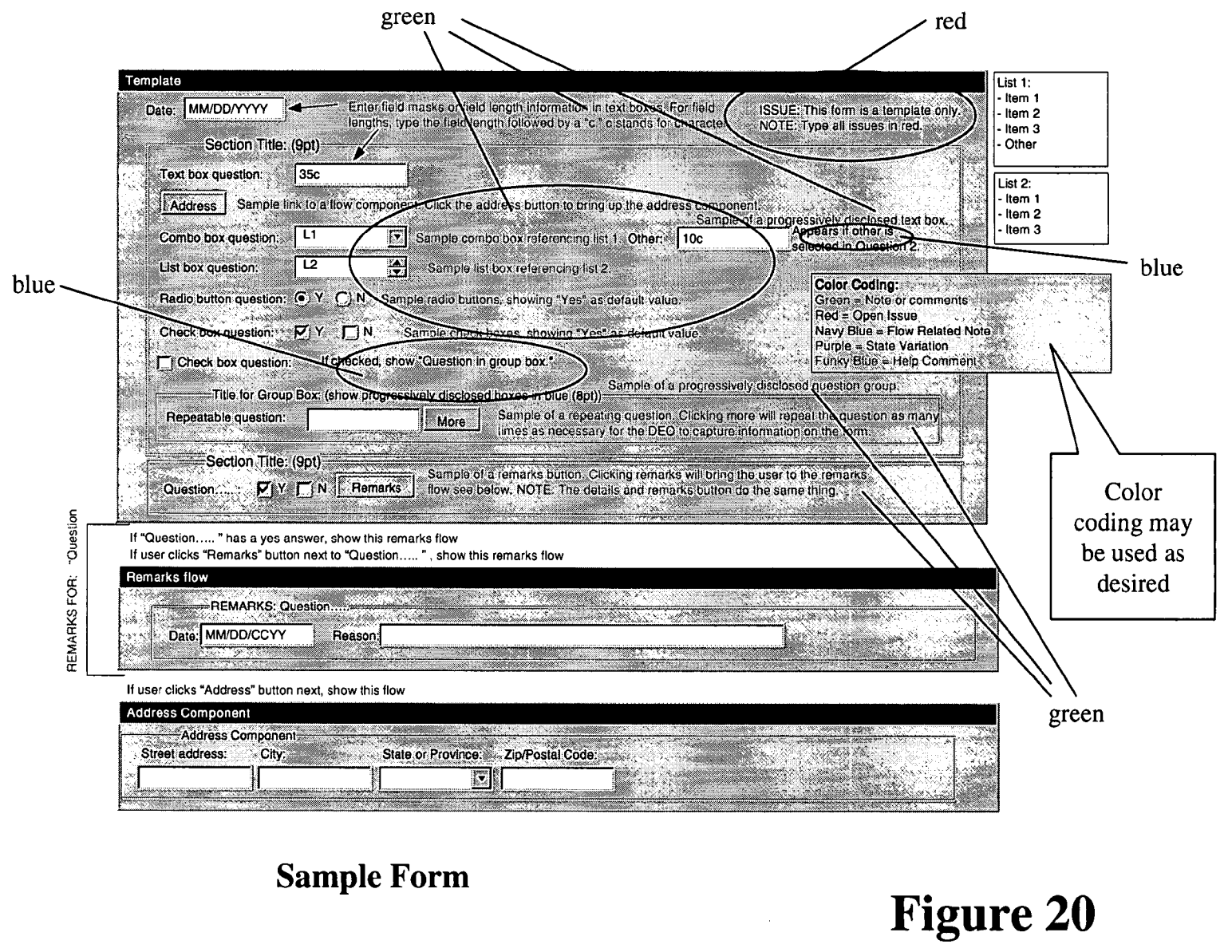

As described herein, various form flows may be utilized. In accordance with one embodiment of the invention, the form flows of the invention use visual representations of standard windows user interface components that are used for modeling the actual data entry forms. The method consolidates the presentation of form flow, form content, and field level information into a single easy to use document. Further to the description above describing various features of the form flow, FIG. 20 is a sample form flow showing a blend of possible information found on a form flow, as well as descriptive text highlighting the features of the form.

Hereinafter, aspects of general implementation of the various embodiments will be described. Various system components and flowcharts are described above. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A system that performs data collection of insurance related submitted data provided by an applicant for insurance on a submitted form, the system comprising:
    a data input portion that inputs the submitted form so that the submitted data on the submitted form is available to a data entry operator, the submitted data containing insurance related data; and
    a data collector tool, which processes entered data that is entered by the data entry operator, onto an internal electronic form, based on the submitted data submitted by the applicant, the data collector including:
        a form flow portion that presents the data entry operator with a series of form flows for collection of the submitted data, the form flows progressing through various user interface screens in collection of the submitted data, the form flows using content sensitive logic; and
        a metadata portion that generates metadata, the metadata containing information about the entered data, the metadata being progressively generated during progression of the form flows through the various user interface screens, the metadata portion being in the form of a tangibly embodied processing machine, the information contained in the metadata including a characteristic of the entered data; and
    the system performing subsequent processing of the entered data based on the characteristic; and
    wherein the metadata being progressively generated is constituted by metadata being generated in conjunction with presentment of each of a plurality of the various user interface screens during the progression of a form flow.

2. The system of claim 1, wherein the metadata is based on input by the data entry operator.

3. The system of claim 2, wherein the metadata portion presents the data entry operator with a plurality of metadata to choose from so as to capture information about the entered data.

4. The system of claim 3, data collector tool provides the data entry operator with the ability to reflect deficient information on the submitted form in conjunction with identifying the deficient information with metadata.

5. The system of claim 4, wherein the deficient information includes at least one of altered information, blank information, and unreadable information.

6. The system of claim 1, wherein the metadata portion presents the metadata to the data entry operator using labels that are each associated with at least one field on the internal electronic form.

7. The system of claim 6, wherein the metadata portion presents the metadata to the data entry operator using labels by modifying the labels using font attributes.

8. The system of claim 7, wherein the font attributes include one of color, bold, underline and italics.

9. The system of claim 7, wherein the data entry operator controls the operation of the metadata portion using hotkeys, such that the data entry operator controls the labeling of fields using metadata as the data entry operator desires, the hotkeys comprising a series of keystrokes.

10. The system of claim 6, wherein a single label containing the metadata is associated with a single field on the internal electronic form.

11. The system of claim 6, wherein a single label containing the metadata is associated with a plurality of fields on the internal electronic form.

12. The system of claim 1, wherein the data collector tool further includes a validation portion, the validation portion performing validation checks on the entered data entered on the internal electronic form.

13. The system of claim 12, wherein the validation portion performs a validation process on a field upon exiting the field.

14. The system of claim 12, wherein the internal electronic form is arranged based on pages of the internal electronic form, the validation portion performs a validation process on a page upon exiting the page.

15. The system of claim 1, wherein the data tool collector allows a subsequent user to vary the metadata of the internal electronic form after initial entry by the data entry operator and to properly reflect that correction.

16. The system of claim 1, wherein the data input portion processes a scanned version of the submitted form and presents the scanned version of the submitted form to the data entry operator via the user interface.

17. A computer-implemented method that performs data collection of insurance related submitted data provided by an applicant for insurance on a submitted form, the method comprising:

inputting, by a tangibly embodied processing machine, the submitted form so that the submitted data on the submitted form is available to a data entry operator, the submitted data containing insurance related data;

performing, by the tangibly embodied processing machine, a data collection process by which entered data is entered by the data entry operator onto an internal electronic form, based on the submitted data submitted by the applicant, the performing a data collection process including:

generating a form flow progression that presents the data entry operator with a series of form flows for collection of the submitted data, the form flows progressing through various user interface screens in collection of the submitted data, the form flows using content sensitive logic;

selectively generating metadata associated with the entered data, the metadata containing information about the entered data, the metadata being progressively generated during progression of the form flows through the various interface screens, the information contained in the metadata including a characteristic of the entered data; and the method including performing subsequent processing of the entered data based on the characteristic; and wherein the metadata being progressively generated is constituted by metadata being generated in conjunction with presentment of each of a plurality of the various user interface screens during the progression of a form flow.

18. The computer-implemented method of claim 17, wherein the metadata is based on input by the data entry operator.

19. The computer-implemented method of claim 17, wherein the data entry operator is presented with a plurality of metadata to choose from so as to capture information about the entered data.

20. The computer-implemented method of claim 17, wherein the metadata is presented in the form of labels that are each associated with at least one field on the internal electronic form.

21. A computer readable medium that performs data collection of insurance related submitted data provided by an applicant for insurance on a submitted form, the computer readable medium being tangibly embodied, the computer readable medium comprising:

a first portion that inputs the submitted form so that the submitted data on the submitted form is available to a data entry operator;

a second portion, which processes entered data that is entered by the data entry operator, onto an internal electronic form, based on the submitted data submitted by the applicant, the second portion including:

a third portion that presents the data entry operator with a series of form flows for collection of the submitted data, the form flows progressing through various user interface screens in collection of the submitted data, the form flows using content sensitive logic;

a fourth portion that generates metadata, the metadata containing information about the entered data, the metadata being progressively generated during progression of the form flows through the various user interface screens, the information contained in the metadata including a characteristic of the entered data; and a fifth portion that performs subsequent processing of the entered data based on the characteristic; and wherein the metadata being progressively generated is constituted by metadata being generated in conjunction with presentment of each of a plurality of the various user interface screens during the progression of a form flow.

22. A system that performs data collection of insurance related submitted data provided by an applicant for insurance on a submitted form, the system comprising:

a data input portion that inputs the submitted form so that the submitted data on the submitted form is available to a data entry operator;

a data collector tool, being in the form of a tangibly embodied processing machine, which processes entered data that is entered by the data entry operator, onto an internal electronic form, based on the submitted data submitted by the applicant, the data collector including:

a form flow portion that presents the data entry operator with a series of form flows for collection of the submitted data, the form flows progressing through various user interface screens in collection of the submitted data, the form flows using content sensitive logic, and the form flows using content sensitive logic including:

determining whether first information or second information is in a field of a user interface screen;

the form flow portion being provided to, upon detecting that the first information is entered into the field, generate a first set of questions based on the detecting of the first information; and the form flow portion being provided to, upon detecting that the second information is entered into the field, generate a second set of questions based on the detecting of the second information;

a metadata portion that generates metadata, the metadata containing information about the entered data, the metadata being progressively generated during progression of the form flows through the various user interface screens, the metadata being progressively generated is constituted by metadata being generated in conjunction with presentment of each of a plurality of the various user interface screens during the progression of a form flow, the information contained in the metadata including a characteristic of the entered data; and the system performing subsequent processing of the entered data based on the characteristic;

wherein the metadata portion presents the data entry operator with a plurality of metadata to choose from so as to capture information about the entered data, and the data collector tool provides the data entry operator with the ability to reflect deficient information on the submitted form in conjunction with identifying the deficient information with metadata; and wherein the metadata portion presents the metadata to the data entry operator using labels that are each associated with at least one field on the internal electronic form.

* * * * *